(12) United States Patent
Damon et al.

(10) Patent No.: US 11,065,087 B2
(45) Date of Patent: Jul. 20, 2021

(54) ORTHODONTIC BRACKET APPARATUS AND METHOD FOR TREATING A MALOCCLUSION

(71) Applicant: Premier Orthodontic Designs, LLLP, Carson City, NV (US)

(72) Inventors: Paul L. Damon, Spokane, WA (US); Dwight H. Damon, Spokane, WA (US)

(73) Assignee: Premier Orthodontic Designs LLLP, Carson City, NV (US)

( * ) Notice: Subject to any disclaimer, the term of this patent is extended or adjusted under 35 U.S.C. 154(b) by 465 days.

(21) Appl. No.: 15/895,190

(22) Filed: Feb. 13, 2018

(65) Prior Publication Data

US 2018/0168777 A1 Jun. 21, 2018

Related U.S. Application Data

(63) Continuation-in-part of application No. 14/702,961, filed on May 4, 2015, now Pat. No. 10,945,815.

(51) Int. Cl.
*A61C 7/20* (2006.01)
*A61C 7/14* (2006.01)
*A61C 7/28* (2006.01)

(52) U.S. Cl.
CPC .............. *A61C 7/20* (2013.01); *A61C 7/14* (2013.01); *A61C 7/143* (2013.01); *A61C 7/148* (2013.01); *A61C 7/141* (2013.01); *A61C 7/287* (2013.01)

(58) Field of Classification Search
CPC ........... A61C 7/14; A61C 7/141; A61C 7/143; A61C 7/148; A61C 7/20; A61C 7/287; A61C 7/28

USPC ........................................................... 433/16
See application file for complete search history.

(56) References Cited

U.S. PATENT DOCUMENTS

| | | | | |
|---|---|---|---|---|
| 4,243,387 A | * | 1/1981 | Prins | A61C 7/12 433/16 |
| 4,427,381 A | | 1/1984 | Hall | |
| 5,302,121 A | | 4/1994 | Gagin | |
| 5,464,347 A | * | 11/1995 | Allesee | A61C 7/12 433/16 |
| 5,820,370 A | * | 10/1998 | Allesee | A61C 7/12 433/8 |
| 5,954,502 A | | 9/1999 | Tuenge et al. | |

(Continued)

OTHER PUBLICATIONS

PCT Search Report dated Apr. 14, 2014.
(Continued)

*Primary Examiner* — Edward Moran
*Assistant Examiner* — Matthew P Saunders
(74) *Attorney, Agent, or Firm* — Wood Herron & Evans LLP

(57) ABSTRACT

An orthodontic bracket apparatus and method for treating a malocclusion includes a bracket base having an angulated posterior facing surface and which is matingly and releasably positioned adjacent to an anterior facing surface of a patient's tooth; a multiplicity of bracket bodies releasably and adjustably engageable with the bracket base; and an arch wire simultaneously engageable within an arch wire slot defined in each of the bracket bodies to exert first, second and third order movements to the maloccluded tooth; and wherein the bracket base remains affixed to the patient's tooth throughout the multiple step orthodontic treatment regimen selected by the treating clinician.

14 Claims, 18 Drawing Sheets

(56) References Cited

U.S. PATENT DOCUMENTS

| | | | |
|---|---|---|---|
| 6,071,118 A * | 6/2000 | Damon | A61C 7/287 |
| | | | 433/9 |
| 7,431,586 B1 | 10/2008 | Silverman | |
| 8,366,440 B2 * | 2/2013 | Bathen | A61C 7/28 |
| | | | 433/16 |
| 9,198,740 B2 * | 12/2015 | Damon | A61C 7/30 |
| 9,636,191 B2 * | 5/2017 | Damon | A61C 7/30 |
| 2002/0110771 A1 | 8/2002 | Abels et al. | |
| 2008/0293005 A1 | 11/2008 | Rahlis et al. | |
| 2010/0285420 A1 * | 11/2010 | Oda | A61C 7/287 |
| | | | 433/11 |
| 2010/0304321 A1 * | 12/2010 | Patel | A61C 7/20 |
| | | | 433/9 |
| 2011/0311934 A1 | 12/2011 | Kantomaa | |
| 2012/0064475 A1 | 3/2012 | Lewis et al. | |
| 2012/0122050 A1 * | 5/2012 | Bathen | A61C 7/28 |
| | | | 433/14 |
| 2012/0276496 A1 * | 11/2012 | Bathen | A61C 7/28 |
| | | | 433/9 |
| 2014/0205962 A1 | 6/2014 | Damon et al. | |
| 2015/0050612 A1 * | 2/2015 | Damon | A61C 7/14 |
| | | | 433/13 |
| 2015/0230887 A1 * | 8/2015 | Damon | A61C 7/14 |
| | | | 433/9 |
| 2015/0238281 A1 * | 8/2015 | Alauddin | A61C 7/28 |
| | | | 433/11 |
| 2016/0045284 A1 * | 2/2016 | Damon | A61C 7/287 |
| | | | 433/16 |
| 2016/0045285 A1 * | 2/2016 | Damon | A61C 7/14 |
| | | | 433/16 |
| 2016/0045286 A1 * | 2/2016 | Damon | A61C 7/141 |
| | | | 433/16 |

OTHER PUBLICATIONS

PCT Office, International Preliminary Report on Patentability issued in PCT/US2019/017575 dated Aug. 18, 2020.

European Patent Office, Extended European Search Report in corresponding European Application No. 16789743.8 dated Nov. 28, 2018.

Japanese Patent Office, Office Action issued in JP 2017-555622 dated Apr. 23, 2020, 3 pages.

Japanese Patent Office, Office Action issued in JP 2017-555622 dated Mar. 16, 2021.

\* cited by examiner

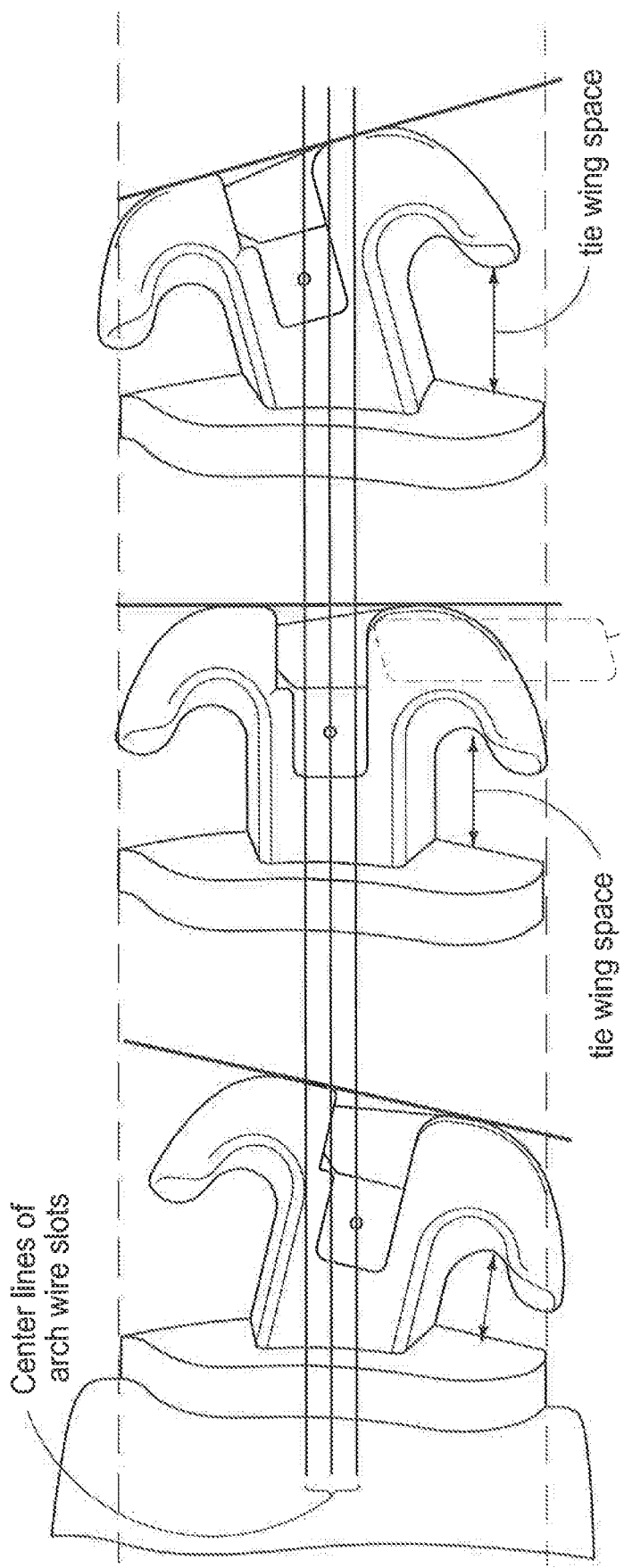

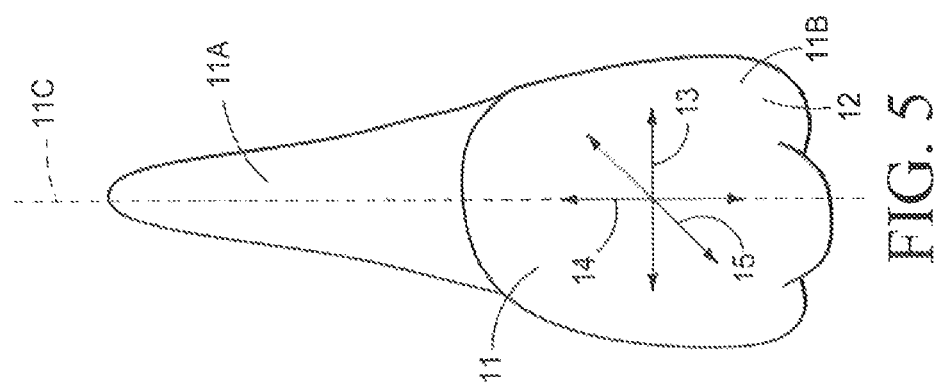
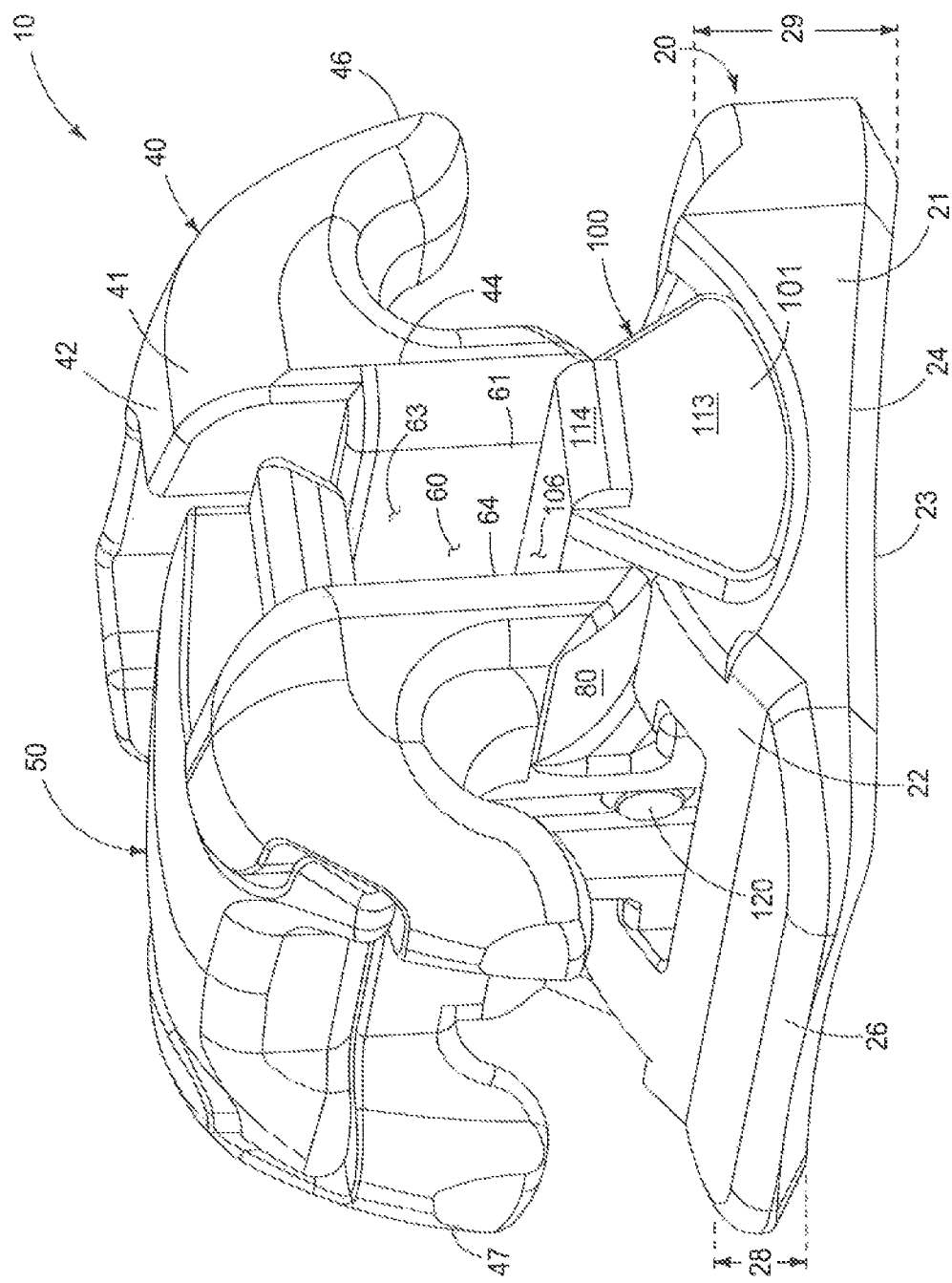

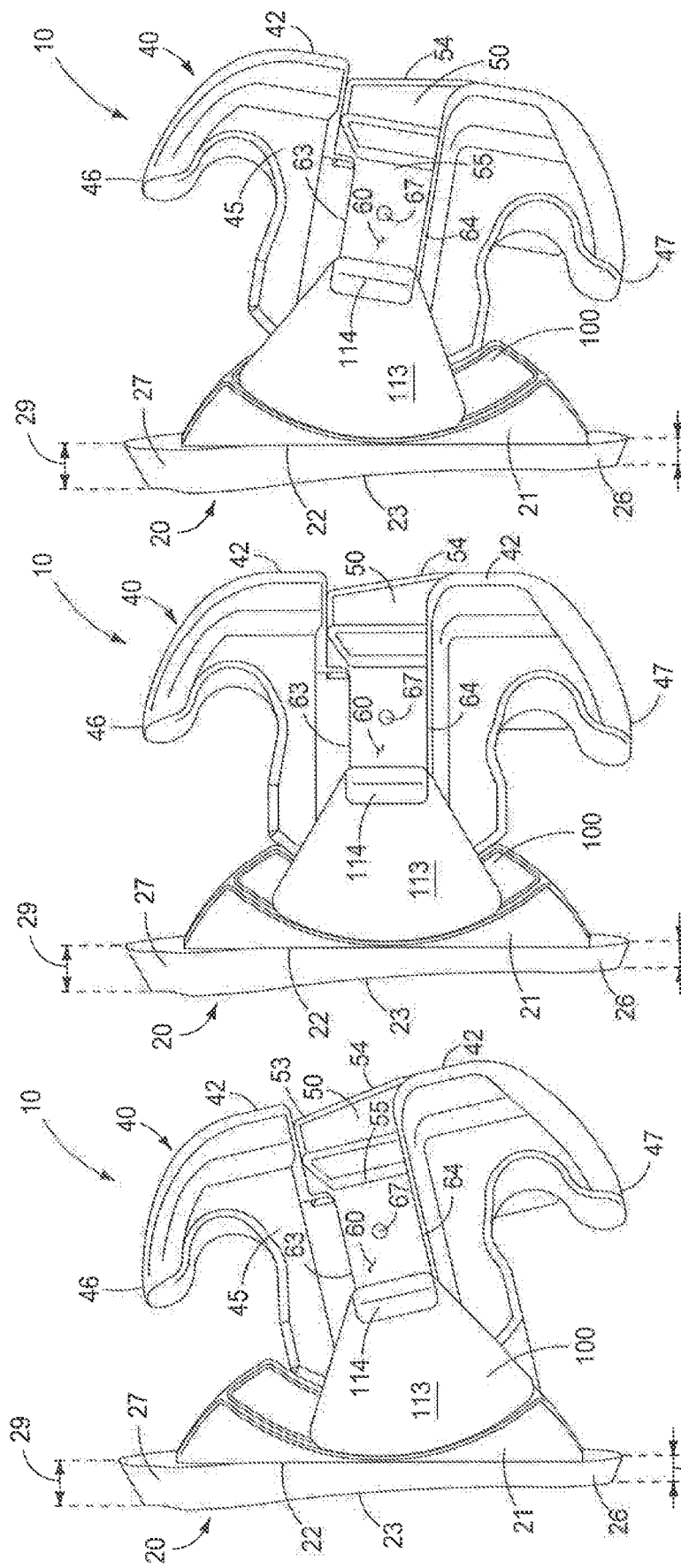

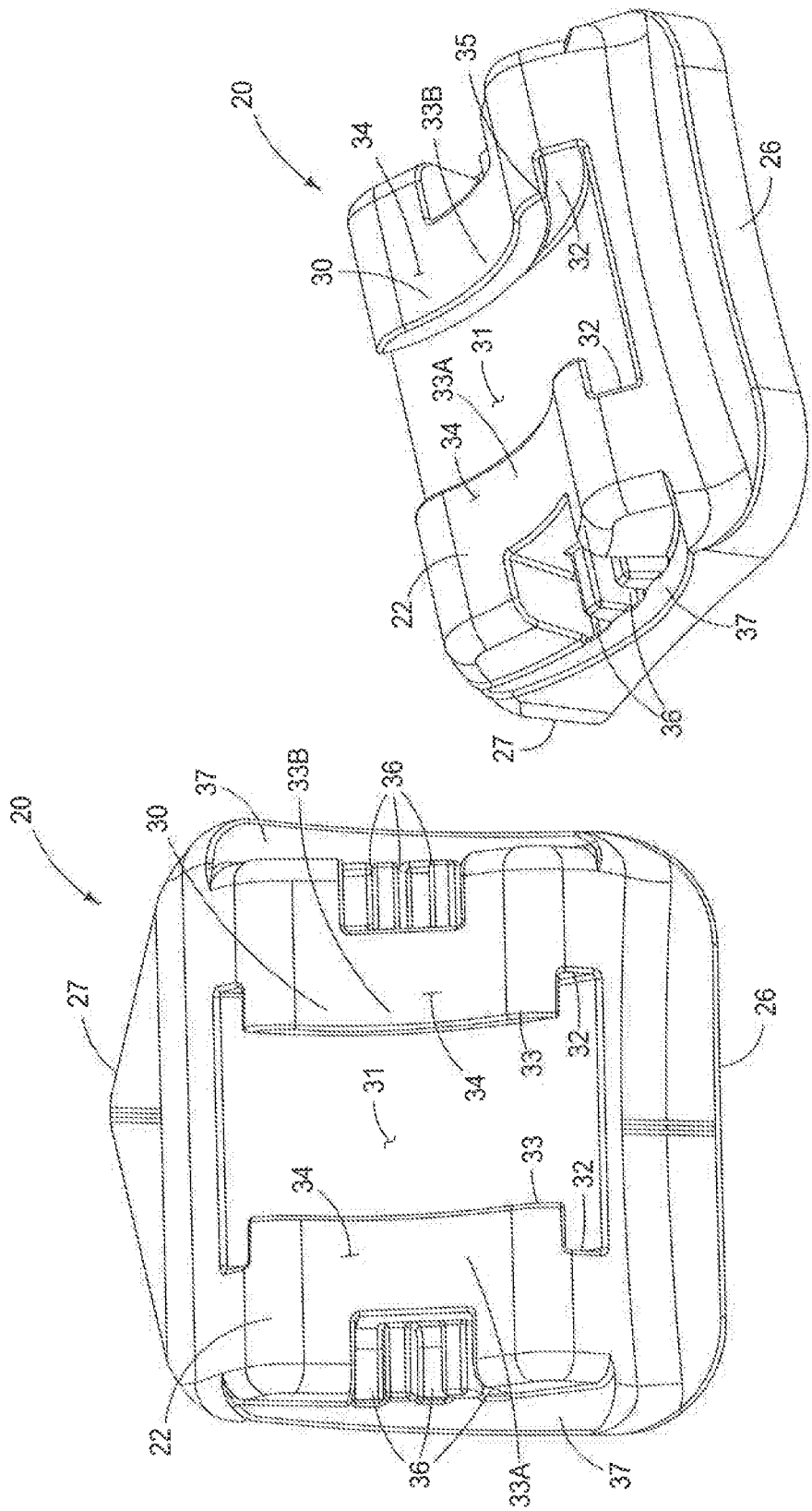

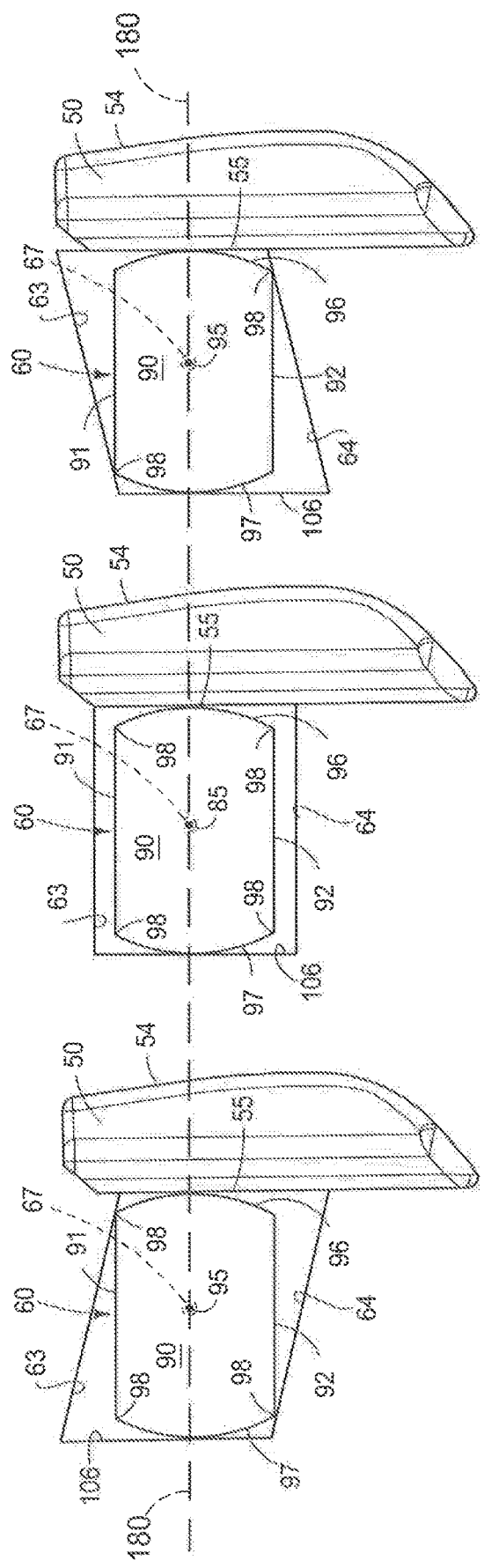

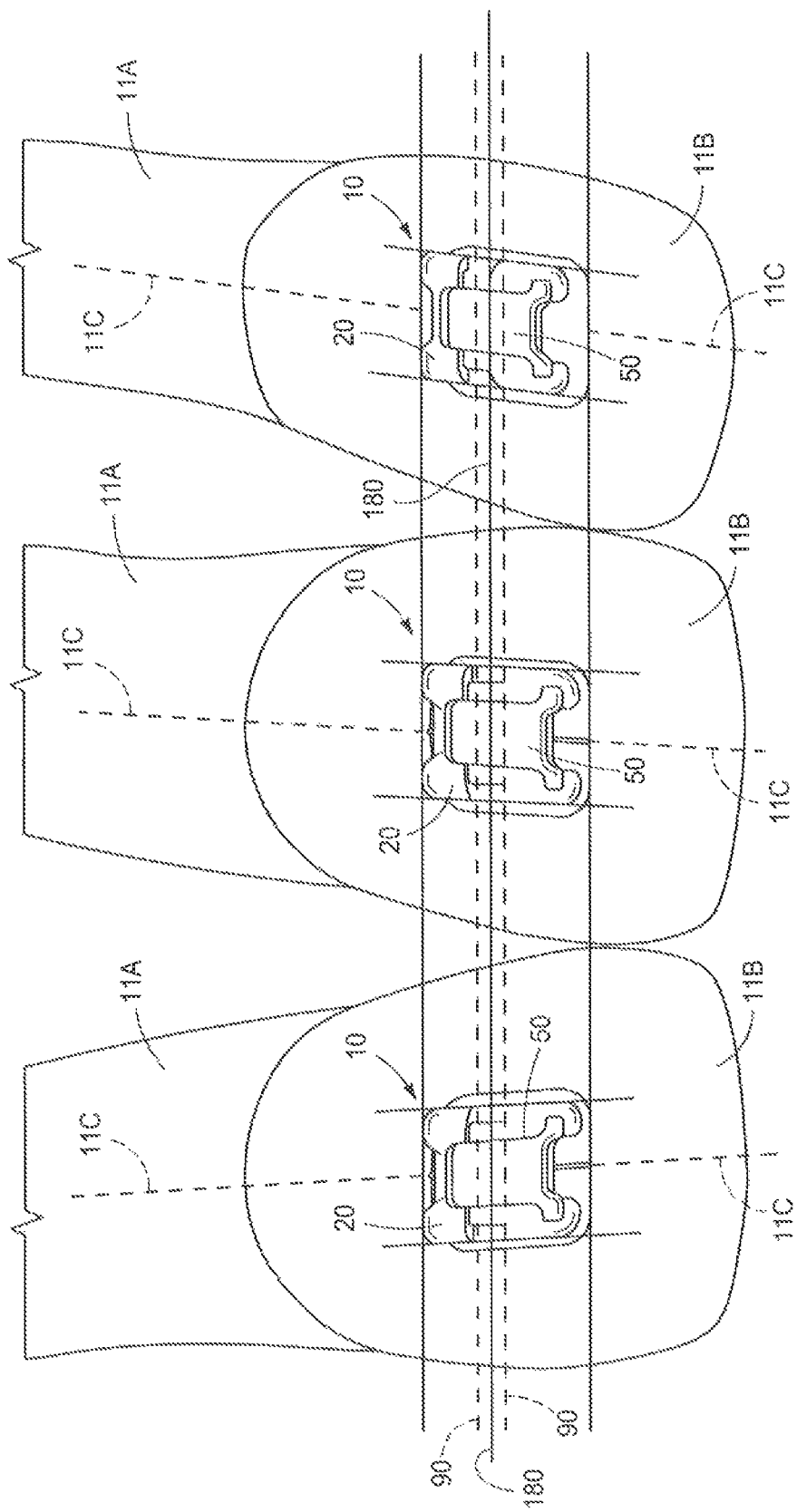

ORTHODONTIC BRACKET APPARATUS AND METHOD FOR TREATING A MALOCCLUSION

RELATED APPLICATIONS

This utility patent application is a Continuation-In-Part (CIP) patent application of co-pending U.S. patent application Ser. No. 14/702,961 filed on May 4, 2015. The inventors of the instant invention are the same named inventors of earlier filed co-pending U.S. Ser. No. 14/702,961. The entire contents of aforementioned co-pending U.S. Ser. No. 14/702,961, and the teaching's thereof, are expressly incorporated herein by this reference.

TECHNICAL FIELD

The present invention relates to an orthodontic bracket apparatus and a method for treating a malocclusion, and more specifically to an orthodontic bracket which, in combination with a novel arch wire, can be rendered operable, in various forms, to provide a multiplicity of torque expressions, and which individually, and forcibly act upon a patient's tooth while simultaneously remaining substantially in the same relative orientation on the anterior facing surface of a patient's tooth. Further, the new orthodontic bracket eliminates the prior art practice of deforming or otherwise bending an associated arch wire so as to achieve a given torque expression which imparts a predetermined clinically significant movement to the patient's tooth.

BACKGROUND OF THE INVENTION

In our earlier U.S. patent applications Ser. Nos. 14/702,961, and 14/976,074, the teachings of which are expressly and entirely incorporated herein by reference, we disclosed a novel orthodontic bracket which was readily, and easily utilized by a clinician, in a treatment setting, and which further provided a convenient means for movably adjusting the new orthodontic bracket in order to achieve a clinician selected first, second and/or third order movement of a patient's tooth in a manner not possible heretofore. In particular the aforementioned new and novel orthodontic bracket included a bracket base which was affixed to the anterior facing surface of a patient's tooth, and which further had a bracket body which was partially, rotatably moveable relative to the bracket base, in a fixed axis of movement, when the bracket base was suitably affixed to the tooth, and an arch wire. The teachings of this patent application disclose a bracket body which can be releasably detached from the bracket base, and an alternative bracket body releasably attached to the bracket base during a given orthodontic treatment plan in order to provide a clinician a wide range of treatment options in advancing an orthodontic treatment regimen, and achieving desired first, second and third order movement of a patient's tooth in a manner not possible with prior art appliances which have been employed in the past.

In our recent U.S. patent application Ser. No. 14/976,074, and which was filed on Dec. 21, 2015, we disclosed an arch wire for use with a passive ligation orthodontic bracket having an arch wire slot, and wherein the arch wire further includes an elongated, and resilient main body which is dimensioned to be received within the arch wire slot of the passive ligation bracket. The resilient main body of the arch wire has a circular-square or circular-rectangular cross-sectional shape having a predetermined circumferential width dimension, and a variable thickness dimension. The circumferential width dimension of the resilient main body of the new arch wire maintains, at least in part, a consistent first order movement of a tooth of a patient when the resilient main body of the arch wire is received within the arch wire slot, and is cooperating with the passive ligation bracket body. The variable thickness dimension of the new arch wire facilitates an adjustable application of a force to the passive ligation orthodontic bracket so as to achieve a clinician selectable, and controllable, second and third order of movement of the tooth of a patient. The arch wire as described in this pending U.S. Patent Application has found particular usefulness when used with the orthodontic bracket design as taught in U.S. Pat. No. 9,198,740. Prior to the introduction of the orthodontic bracket as described in U.S. Pat. No. 9,198,740, passive self-ligation orthodontic brackets were commercially available, and which provided first, second or third order control over a patient's tooth. Several forms of these prior art self-ligating orthodontic brackets are seen in the drawings (FIGS. 1-3). These prior art passive self-ligation orthodontic brackets, have displayed shortcomings while being employed in some clinical settings which include, among others, providing an anterior facing surface which has a variable angular orientation based upon the type of torque control which was desired and being expressed. For example, the prior art includes orthodontic brackets which can express high or low torque couples (FIGS. 1 and 3 respectively). These particular orthodontic brackets have anterior facing surfaces which are oriented along different anterior-facing planes. Of course, these anterior facing surfaces come into contact with the inside of the lip of the patient wearing the same, and sometimes create a different physical sensation for the patient wearing these orthodontic brackets (so called "mouth feel"). Still further, the orientation of the bracket body on the pad of these prior art orthodontic brackets (FIGS. 1 and 3) were such that the tie wing spacing, that is, the space between the tie wing of the bracket body, and the adjacent pad which was affixed to the anterior facing surface of the patient's tooth, varied when measured between the superior and inferior facing surfaces of the bracket body. Consequently, some clinicians often found it difficult to place and secure individual arch wires within the arch wire slot, and further, it was oftentimes difficult for patients to maintain the cleanliness of their teeth because of the close spacial tolerances of the bracket bodies relative to the adjacent pad, and which supports the bracket body on the patient's tooth. This was especially true for orthodontic brackets which expressed high and low couples (FIGS. 1 and 3). Still further, achieving a clinically desirable deployment, placement or installation of these orthodontic brackets, especially on the upper and lower cuspids of a patient, often proved problematic. As can be imagined by studying FIGS. 1-3, the visual alignment of these prior art orthodontic brackets by a clinician on adjacent teeth of a patient, and in the same horizontal plane, by the alignment of the respective pads was virtually impossible to achieve because of the different angular orientations of each bracket body. Additionally, the use of these prior art passive ligation orthodontic brackets often created other perceived difficulties for many clinicians inasmuch as the physical orientation of the bracket body often prevented or made it problematic for the clinician to appropriately orient the respective orthodontic brackets on adjacent teeth in order to achieve an ideal arch wire slot lineup which would facilitate the proper amount of torque being applied to the individual teeth undergoing correction. The horizontal lines shown on FIGS. 1-3 show that the centers of the archwire slots do not align, even when the brackets themselves are aligned.

Notwithstanding the difficulties, noted above, these prior art orthodontic brackets, when used with a conventional arch wire, effected patient tooth movement by the transmission of torque to the tooth to which the bracket was attached through the base or pad of the orthodontic bracket (this is often referred to as a "torque-in-base bracket"). These prior art orthodontic brackets provided advancement in the quality of orthodontic treatment, and have been utilized by many clinicians. However, because of the problems associated with the tie wing spacing, and which has often restricted the placement of C-chains, and elastics, on these appliances, and the problems associated with aligning the orthodontic bracket with adjoining orthodontic brackets to try and achieve level arch wire slot line-up, these orthodontic brackets have not been as widely embraced by clinicians as might have been expected. In fact, the aforementioned shortcomings has been one of the major objections of many clinicians to utilizing passive ligation orthodontic brackets to achieve the kind of orthodontic treatment which is desired. In view of the aforementioned perceived shortcomings, many clinicians have failed to adopt this type or style of orthodontic bracket in their clinical practice. Consequently, the treatment times for many patients is often unduly long, and on many occasions, clinicians are not able to achieve the proper final tooth orientation which is desired for their patients.

While the aforementioned new orthodontic bracket as seen in U.S. Pat. No. 9,198,740, and the new arch wire as described in U.S. patent application Ser. No. 14/976,074 have operated with a great deal of success, some difficulties still remain for clinicians in establishing the proper orientation or placement of an orthodontic bracket on a patient's teeth, such as on the upper and lower cuspids. These, and other perceived problems have caused each of the inventors to reflect, at great length, concerning a possible solution to the various clinician perceived problems, and other shortcomings, which are associated with the placement of orthodontics brackets in a proper orientation relative to each other, and on other somewhat problematic teeth. This study, and later investigation, led to the reevaluation of both the perceived shortcomings of the prior art (FIGS. 1-3), as well as the many advantages provided by the use of the orthodontic bracket as seen in the earlier U.S. patent, and the new arch wire which has enhanced the use and operation of this same orthodontic bracket. This investigation has resulted in the creation of a new orthodontic bracket apparatus and method for treating a malocclusion, which is the subject matter of the present application.

The orthodontic bracket of the present invention avoids the detriments and shortcomings associated with the prior art passive ligation orthodontic brackets (FIGS. 1-3) discussed above, and further allows clinicians additional clinical options in providing first, second or third order control for problematic maloccluded teeth, such as the upper and lower cuspids, which have often been difficult for a clinician to correct. A new orthodontic bracket apparatus and method for treating a malocclusion is the subject matter of the present patent application.

SUMMARY OF THE INVENTION

A first aspect of the present invention is an orthodontic bracket apparatus and method for treating a malocclusion, comprising a bracket base which is configured for releasable attachment upon on an anterior facing surface of a patient's tooth, which requires an orthodontic treatment regimen which is selected by a clinician; and multiple bracket bodies which can individually, matingly, adjustably and sequentially cooperate with the bracket base so as to facilitate the orthodontic treatment regimen for a patient by the treating clinician, and without a removal of the bracket base from the anterior facing surface of the patient's tooth during the orthodontic treatment regimen, and each of the multiple bracket bodies defines a three sided arch wire slot in an anterior facing surface portion, and the three sided arch wire slot has two spaced apart parallel side walls, a slot opening and a base wall opposite the slot opening, and a bracket body insert that is releasably carried within the arch wire slot and adjacent to the base wall, the bracket body insert having an engaging portion that communicates with the bracket base to positionally secure the bracket body in a predetermined angular orientation relative to the bracket base and an arch wire for releasable simultaneous engagement with the arch wire slot defined by each of the multiple bracket bodies the arch wire having a first original configuration positioned in closely spaced relationship relative to, and along, a dental arch of a patient, and wherein the arch wire has a substantially uniform, circular square or circular rectangular cross-sectional shape, and wherein the substantially uniform cross-sectional shape has only two diametrically opposed radially curved surfaces.

A further aspect of the present invention is an orthodontic bracket apparatus wherein the bracket base has an anterior facing surface and a posterior facing surface with a thickness dimension therebetween, and the thickness dimension at a first edge portion of the bracket base is different from the thickness dimension at a second spaced apart edge portion of the bracket base and wherein the differing thickness dimensions of the bracket base from the first edge portion to the second edge portion is linear, and is between approximately 6.5° and 8.5° of angulation.

A further aspect of the present invention is an orthodontic bracket apparatus further comprising a medial passageway defined in the bracket body communicating from the base wall of the archwire slot to an opposing posterior surface of the bracket body, and a transversely extending through hole defined in the bracket body spacedly adjacent the posterior surface and perpendicular to the archwire slot, the transverse through hole intersecting the medial passageway and configured to releasably carry a retention pin therein; and wherein the bracket body insert has an elongated main body with the first end, a second end, a top, a bottom, an anterior facing surface, a posterior facing surface and an engagement member configured to be axially received within the medial passageway defined by the bracket body, the engagement member extending generally perpendicularly from the posterior facing surface medially between the first end and the second end, the engagement member further has a distal end spaced apart from the main body and defines an elongated hole communicating between the top and the bottom, and between the distal end and the main body, and when the engagement member is engaged within the medial passageway defined by the bracket body, the elongated hole is aligned with the transverse through hole defined in the bracket body, and the engagement member carries friction ridges thereon to frictionally communicate with peripheral surfaces of the medial passageway to eliminate any "movement" therebetween; and the elongated hole defined in the engagement member, in cooperation with the retention pin extending therethrough allows limited axial movement of the bracket body insert relative to the bracket body so as to allow the bracket body to be rotatably moved relative to the respective bracket base permitting the treating clinician to adjust the relative position of the respective bracket bodies relative to the respective bracket bases so as to facilitate the orthodontic treatment regimen of the patient.

A further aspect of the present invention is an orthodontic bracket apparatus wherein the bracket body insert is operable to cooperate with the respective bracket bodies, and which further releasably secures the respective bracket bodies in a predetermined orientation relative to the bracket base and the patient's tooth during the orthodontic treatment regimen, and wherein the respective bracket bodies each have an anterior facing surface which defines an arch wire slot, and an opposite posterior facing surface which moveably cooperates with the bracket base, and wherein the bracket body insert is conformably dimensioned to be received in the arch wire slot, and wherein a passageway extends through the respective bracket bodies from the arch wire slot to the posterior facing surface of the respective bracket bodies, and wherein the bracket body insert further comprises an elongated main body having a flange portion at an end portion of the elongated main body, and wherein the flange portion extends outwardly relative to the bracket body, and is further dimensioned to be received within a side recess defined in a side portion of the bracket base when the bracket body insert is engaged with both of the bracket body and the bracket base, and wherein the flange portion is configured so as to permit limited movement of the bracket body insert relative to the respective bracket body and arch wire slot, but prevents removal of the bracket body insert from the arch wire slot, and wherein the limited movement of the bracket body insert relative to the bracket body permits a clinician to adjust the relative position of the respective bracket bodies relative to the bracket base so as to facilitate the orthodontic treatment regimen of the patient.

A further aspect of the present invention is an orthodontic bracket apparatus wherein the multiple-step orthodontic treatment method or regimen includes the treatment of a multiplicity of the patient's teeth, and which have individually unique orthodontic anomalies, and wherein the same bracket base is employed on each of the patient's teeth, and remains affixed to the patient's teeth during the entire orthodontic treatment regimen.

A further aspect of the present invention is an orthodontic bracket apparatus for treating a malocclusion, comprising a bracket base which is releasably retained on an anterior facing surface of one of a multiplicity of a patient's teeth, and wherein at least some of the patient's teeth require an orthodontic treatment regimen which is implemented substantially simultaneously by a clinician, and wherein the bracket base has a thickness dimension that is different at opposing edge portions of the bracket base so as to provide angulation relative to the adjacent tooth, and the bracket base remains affixed to the anterior facing surface of the patient's tooth during the orthodontic treatment regimen; multiple bracket bodies which can individually, matingly, and sequentially cooperate with, and partially rotate relative to the bracket base so as to facilitate the orthodontic treatment regimen, and wherein each bracket body defines a three sided arch wire slot in an anterior surface portion, and each arch wire slot has two spaced apart parallel side walls, a slot opening and a base wall opposite the slot opening, and each three sided arch wire slot further has a central region, and a center, and which further is oriented along a given line of reference, and which extends between the center of the arch wire slot, and the centers of other arch wire slots of still other bracket bodies which are located on the patient's other, and adjacent teeth which are undergoing the orthodontic treatment regimen; and an arch wire extending between, and received within, the three sided arch wire slot of each of the respective bracket bodies, and which are releasably positioned on the anterior facing surface of the respective patient's teeth, and which further are undergoing the orthodontic treatment regimen, and wherein a partial rotation of a bracket body, relative to the respective bracket base, permits a clinician to impart a predetermined amount of torque on the patient's respective teeth by forcibly engaging the arch wire which is substantially enclosed within the arch wire slot, and wherein an adjustment of the predetermined amount of torque and/or a replacement of the bracket body which releasably engages the bracket base takes place while the center of each bracket body arch wire slot remains substantially oriented along the predetermined line of reference, and in substantially the same vertical position relative to the arch wire slot of the bracket bodies which are located on the adjacent teeth of the patient.

A further aspect of the present invention is an orthodontic bracket apparatus for treating a malocclusion comprising an arch wire having a first original configuration positioned in closely spaced relationship relative to, and along, a dental arch of a patient, and wherein the arch wire has a substantially uniform, circular-square or circular-rectangular cross-sectional shape, and wherein the substantially uniform cross-sectional shape has only two diametrically opposed radially curved surfaces; a first orthodontic bracket, and a second orthodontic bracket, and wherein each of the first and second orthodontic brackets have, a bracket body and a bracket base, which is located on a posterior side of the bracket body, and further having a posterior surface adapted to be releasably affixed to an anterior facing surface of a patient's tooth, and wherein each bracket body further has an anterior, outwardly facing surface defining an opening to a three sided arch wire slot defined in the bracket body, and wherein the three sided arch wire slot is sized so as to receive the arch wire therein, and the anterior outwardly facing portion of the bracket body is configured to slidably carry a movable gate, and wherein the movable gate has an anterior facing surface and an opposing posterior facing surface, and is further slidably movable between an open position relative to the opening of the arch wire slot, and a closed position relative to the opening of the arch wire slot, and wherein, when the moveable gate is located in the closed position relative to the opening of the arch wire slot, the posterior facing surface of the moveable gate and the arch wire slot define a four sided arch wire channel having a cross-sectional, quadrilateral shape that is defined by four angles which are not necessarily right angles, and wherein the quadrilateral arch wire channel substantially encloses and cooperates with the arch wire to apply a predetermined force to the bracket body so as to effect first, second, or third order movements to the patient's tooth, and wherein the arch wire is movable axially within the quadrilateral arch wire channel and relative to the bracket body, and wherein the anterior facing surface of the moveable gate lies substantially along a plane defined by the anterior, outwardly facing surface of the bracket body; a rib on the anterior facing surface of the moveable gate maintains a precise angular orientation of the moveable gate relative to the bracket body; and wherein the first orthodontic bracket is releasably affixed to an anterior surface of a first tooth of the patient, and the first orthodontic bracket has a first angular orientation of its respective quadrilateral arch wire channel relative to its respective bracket body so as to direct a first predetermined force to the first tooth and effect a resulting movement of the first tooth; and wherein the second orthodontic bracket is releasably affixed to an anterior surface of a second tooth of the patient, and wherein the second orthodontic bracket has a second angular orientation for its respective quadrilateral arch wire channel relative to its respective bracket body so as to direct a second predetermined force to the second tooth, and effect a resulting movement of the second tooth, and wherein the first angular orientation is different than the second angular orientation; and wherein the first orthodontic bracket and the second orthodontic bracket align to a center level arch wire slot line-up, and the arch wire is not intentionally distorted prior to placement within the respective arch wire slots defined in the respective bracket bodies to assume a shape different from the original first configuration so as to impart a force to the first tooth or the second tooth.

A further aspect of the present invention is an orthodontic bracket apparatus wherein the cross-sectional quadrilateral shape of the four sided arch wire channel is a parallelogram.

A further aspect of the present invention is an orthodontic bracket apparatus wherein the bracket base of the first orthodontic bracket is aligned on the first tooth based at least in part on a longitudinal axis of the first tooth, and the bracket base of the second orthodontic bracket is aligned on the second tooth based at least in part on a longitudinal axis of the second tooth.

A further aspect of the present invention is an orthodontic bracket apparatus wherein the rib on the anterior facing surface of the movable gate is positioned spacedly adjacent the peripheral edge, and the rib slidably engages the respective bracket body to maintain the moveable gate in a precise given orientation relative to the bracket body so as to maintain the precise cross-sectional quadrilateral shape of the arch wire channel, when the movable gate is in the closed position.

A further aspect of the present invention is an orthodontic bracket apparatus wherein the cross-sectional quadrilateral shape of the arch wire channel is defined by parallel, inwardly facing, spaced apart, superior and inferior surfaces of the three sided arch wire slot, an anterior facing surface of the bracket body insert which extends between the superior and inferior facing surfaces of the three sided arch wire slot, and the posterior facing surface of the moveable gate, and wherein the superior inwardly facing surface of the three sided arch wire slot, the inferior inwardly facing surface of the three sided arch wire slot, the anterior facing surface of the bracket body insert, and the posterior inwardly facing surface of the moveable gate are oriented in a same spatial relationship in the first orthodontic bracket and the second orthodontic bracket.

A further aspect of the present invention is an orthodontic bracket apparatus wherein the anterior facing surface of the bracket body insert is parallel to, or is not parallel to, the posterior inwardly facing surface of the movable gate when the respective movable gate is in a closed position relative to the three sided arch wire slot opening.

A further aspect of the present invention is an orthodontic bracket apparatus wherein the substantially uniform cross-sectional shape of the arch wire has a superior facing surface and an inferior facing surface, and the superior facing surface and the inferior facing surface are spaced apart, parallel, and extend between and connect the two diametrically opposed radially convexly curved surfaces.

A further aspect of the present invention is an orthodontic bracket apparatus wherein the arch wire has a predetermined diameter between the two diametrically opposed radially convexly curved surfaces, and wherein the predetermined diameter is selected to maintain a consistent first order movement control of a first tooth of the patient and a second tooth of the patient when the arch wire is within the quadrilateral arch wire channel and cooperating with the respective bracket bodies, and wherein a thickness dimension of the arch wire between two opposing, parallel, planar non-curved surfaces controls an application of force to the respective bracket bodies to direct second or third order movements to the first and second teeth of the patient.

A further aspect of the present invention is an orthodontic bracket apparatus wherein the arch wire channel has a height dimension between a superior inwardly facing surface and an inferior inwardly facing surface of the arch wire slot, and wherein the arch wire has a thickness dimension between two opposing, parallel, planar non-curved surfaces, and wherein the thickness dimension is greater than about 50% of the height dimension of the arch wire channel, and wherein the thickness dimension imparts an amount of torqueing force to the respective bracket body so as to direct the second or third order movements to the respective tooth, while the two diametrically opposed radially convexly curved surfaces of the arch wire maintain first order control of the respective tooth.

A further aspect of the present invention is an orthodontic bracket apparatus wherein each of the two diametrically opposed radially curved surfaces of the arch wire each contact an interior surface of the arch wire channel at only a single point of contact.

A further aspect of the present invention is an orthodontic bracket apparatus wherein the two diametrically opposed convexly radially curved surfaces of the arch wire are arcs having a single shared center.

A further aspect of the present invention is an orthodontic bracket apparatus for treating a malocclusion, comprising an arch wire having a first original configuration positioned in closely spaced relationship relative to, and along, a dental arch of a patient, and wherein the arch wire has a substantially uniform, circular-square or circular-rectangular cross-sectional shape, and wherein the substantially uniform cross-sectional shape has only two diametrically opposed convexly radially curved surfaces; a first orthodontic bracket and a second orthodontic bracket, each of the first and second orthodontic brackets having, a bracket body and a bracket base, the bracket base adjacent a posterior portion of the bracket body and having a posterior surface adapted to be releasably affixed to an anterior facing surface of a patient's tooth, the bracket body further having an anterior, outwardly facing surface defining an opening to an arch wire slot defined in the bracket body, the arch wire slot sized to receive the arch wire therein, and the anterior outwardly facing portion of the bracket body configured to slidably carry a movable gate; the movable gate having an anterior facing surface and an opposing posterior facing surface, and being slidably movable between an open position relative to the opening of the arch wire slot and a closed position relative to the opening of the arch wire slot, and wherein, when the moveable gate is located in the closed position relative to the arch wire slot, the posterior facing surface of the moveable gate and the arch wire slot define a four sided arch wire channel having a cross-sectional quadrilateral shape that has four angles and wherein the quadrilateral arch wire channel encloses and cooperates with the arch wire to apply a predetermined force to the bracket body and the bracket base so as to direct first, second, or third order movements to the patient's tooth, and wherein the arch wire is movable axially within the quadrilateral arch wire channel; the first orthodontic bracket having a first angular orientation of its respective quadrilateral arch wire channel relative to its respective bracket base; the second orthodontic bracket having a second angular orientation of its respective quadrilateral arch wire channel relative to its respective bracket base, and wherein the first angular orientation is different than the second angular orientation; and wherein the first orthodontic bracket and the second orthodontic bracket align to a center level arch wire slot line-up, and the arch wire is not intentionally distorted to assume a shape different from the original first configuration so as to impart a force to the first tooth or the second tooth.

A further aspect of the present invention is an orthodontic bracket apparatus for treating a malocclusion further comprising a second arch wire having a second configuration positioned in closely spaced relationship to, and along the dental arch of a patient, and wherein the second arch wire has a substantially uniform, circular square or circular rectangular cross-sectional shape, and wherein the substantially uniform cross-sectional shape has only two diametrically opposed convexly radially curved surfaces, and further has a superior facing surface and an opposing inferior facing surface, and the superior facing surface and the opposing inferior facing surface are spaced apart and parallel, and extend between and connecting the two diametrically opposed convexly radially curved surfaces, and wherein a dimension between the superior facing surface and the opposing inferior facing surface of the second arch wire is different from that of the first arch wire.

A further aspect of the present invention is an orthodontic bracket apparatus for treating a malocclusion comprising an arch wire having a first original configuration positioned in closely spaced relationship relative to, and along, a dental arch of a patient, and wherein the arch wire has a substantially uniform, circular-square or circular-rectangular cross-sectional shape along its entire length, and wherein the substantially uniform cross-sectional shape has only two diametrically opposed radially convexly curved surfaces, and only two opposed and parallel generally planar surfaces, and the only two opposed and parallel generally planar surfaces extend between and communicate with the only two diametrically opposed radially convexly curved surfaces; a first orthodontic bracket, and a second orthodontic bracket, and wherein each of the first and second orthodontic brackets have a bracket body and a bracket base, which is located on a posterior side of the bracket body, and further having a posterior surface adapted to be releasably affixed to an anterior facing surface of a patient's tooth, and wherein the bracket body further has an anterior, outwardly facing surface defining an opening to a three sided arch wire slot defined in the bracket body, and wherein the three sided arch wire slot is sized so as to receive a bracket body insert and the arch wire therein, and the anterior outwardly facing portion of the bracket body is configured to slidably carry a movable gate, and wherein the movable gate has an anterior facing surface and an opposing posterior facing surface, and is further slidably movable between an open position relative to the opening of the three sided arch wire slot, and a closed position relative to the opening of the arch wire slot, and wherein, when the moveable gate is located in the closed position relative to the arch wire slot, the posterior facing surface of the moveable gate, an anterior surface of the bracket body insert, and the superior and inferior surfaces of the arch wire slot define a four sided arch wire channel having a cross-sectional, quadrilateral shape that is defined by four angles which are not necessarily right angles, and wherein the quadrilateral arch wire channel encloses and cooperates with the arch wire to apply a predetermined force to the bracket body so as to effect first, second, or third order movements to the patient's tooth, and wherein the arch wire is movable axially within the quadrilateral arch wire channel and relative to the bracket body, and wherein the anterior facing surface of the moveable gate lies substantially along a plane defined by the anterior, outwardly facing surface of the bracket body, and a rib on the anterior facing surface of the moveable gate maintains a precise angular orientation of the moveable gate relative to the bracket body, and wherein the first orthodontic bracket is releasably affixed to an anterior surface of a first tooth of the patient, and the first orthodontic bracket has a first angular orientation of its respective quadrilateral arch wire channel relative to its respective bracket base so as to direct a first predetermined force to the first tooth and effect a resulting movement of the first tooth, and wherein the second orthodontic bracket is releasably affixed to an anterior surface of a second tooth of the patient, and the second orthodontic bracket has a second angular orientation of its respective quadrilateral arch wire channel relative to its respective bracket base so as to direct a second predetermined force to the second tooth, and effect a resulting movement of the second tooth, and wherein the first angular orientation is different than the second angular orientation, and wherein the first orthodontic bracket and the second orthodontic bracket align to a center level arch wire slot line-up; and the arch wire is not intentionally distorted to assume a shape different from the original first configuration so as to impart the predetermined force to the first tooth and to the second tooth.

A further aspect of the present invention is an orthodontic bracket apparatus for treating a malocclusion wherein arch wire has an elongated and resilient main body which has a single, predetermined width dimension, and a single predetermined thickness dimension, and wherein the single predetermined width dimension of the resilient main body maintains a consistent first order movement control of the patient's tooth when the resilient main body of the arch wire is received, and enclosed within the quadrilateral arch wire channel throughout the entire orthodontic treatment regimen, and wherein the single predetermined, and uniform thickness dimension of the arch wire facilitates an application of the given torqueing couple to the passive ligation orthodontic bracket body so as to achieve a clinician selectable, and controllable, second and third order movement of the patient's tooth without any intentional distortion, bending, twisting or deformation of the arch wire by the clinician during the selected orthodontic treatment regimen, and wherein the quadrilateral arch wire channel, which encloses the arch wire, maintains the orientation of the enclosed arch wire in a central region of the quadrilateral arch wire channel, so as to achieve the clinician selected first, second and third order movement of the patient's tooth, and wherein the arch wire has a predetermined and constant width dimension which is less than a width dimension of the quadrilateral arch wire channel, and a predetermined and constant thickness dimension which is at least 55 percent of the height dimension of the quadrilateral arch wire channel.

A further aspect of the present invention is an orthodontic bracket apparatus for treating a malocclusion, comprising an arch wire having an elongated body configured to be placed in close adjacent proximity to a patient's dental arch, the body having a center at a longitudinal axis and a cross-sectional configuration having only two opposing and diametrically spaced apart radially convexly curved surfaces and only two opposing and diametrically spaced apart planar surfaces; and a single consistent diameter dimension of the body measured along any line extending from one radially convexly curved surface to the diametrically opposed radially convexly curved surface and passing through the center; and a single consistent thickness dimension of the body measured along any line extending from one planar surface to the diametrically opposed planar surface and perpendicular to the two diametrically opposed apart planar surfaces.

A still further aspect of the present invention is an orthodontic bracket apparatus and method for treating a malocclusion comprising the steps of: inspecting the patient's teeth and identifying a present location and a present orientation of each individual tooth; determining a desired location and a desired orientation of each individual tooth; determining first, second and third order forces necessary to move and re-orient each individual tooth from the present identified location and present identified orientation to the determined desired location and the determined desired orientation; selecting an appropriate bracket base, and an appropriate bracket body and appropriate bracket body insert for each individual tooth to achieve the determined desired movement and re-orientation of each individual tooth from the present location and present orientation to the determined desired location and the determined desired orientation; attaching the selected appropriate bracket base to an anterior facing surface of identified individual tooth and aligning the selected appropriate bracket base to achieve center level arch-wire line-up; attaching the selected appropriate bracket body to each attached bracket base and orienting each selected bracket body relative to the attached bracket base to exert the determined first, second and third order forces to achieve the determined movement of the respective tooth and to achieve center level arch-wire slot line-up; installing the selected bracket body insert into each bracket body that is attached to and oriented relative to the bracket base and inserting a retention pin in a through hole defined in the bracket body insert and the bracket body to positionally secure and positionally maintain the bracket body relative to the bracket base so as to maintain the bracket body orientation and center level arch wire slot line-up; selecting a first appropriate arch wire to engage in the aligned center level arch-wire slot defined by the bracket bodies attached to the bracket bases to exert to the determined first, second and third order forces to achieve the desired movement and the desired orientation of each individual tooth; inserting the selected first appropriate arch wire into the center level arch wire slot defined by each bracket body without materially deforming, bending or twisting the first arch wire out of the first arch wire's original configuration which is substantially similar to the patient's dental arch; slidably attaching a movable gate to each selected bracket body, and urging the moveable gate into a position so that the center level arch-wire slot is substantially closed by the movable gate and the arch-wire within the center level arch-wire slot is only axially movable within the center level arch-wire slot and the arch-wire exerts a first order of movement, a second order of movement and a third order of movement to each individual tooth without exerting the same first order of movement, the same second order of movement or the same third order of movement upon any adjacent tooth; monitoring the first order of movement, the second order of movement, and the third order of movement of each individual tooth from the present location and present orientation of each tooth toward the desired location and the desired orientation of each tooth; determining when each individual tooth has moved in a desired first order, second order and third order of movement to an intermediate location, and an intermediate orientation and a neutral position relative to the arch-wire which is located within the center level arch-wire slot and wherein the first arch wire is no longer exerting first, second and third order forces on the respective tooth; removing the selected first arch-wire from the respective center level arch wire slots defined by the respective bracket bodies; selecting a second appropriate arch wire to be received within in the center level arch-wire slot which is defined by each of the bracket bodies which are releasably attached to the respective bracket bases so as to achieve the desired movement and desired orientation of each individual tooth; inserting the selected second appropriate arch wire into the center level arch wire slot defined by each bracket body and urging the moveable gate into a position so that the center level arch-wire slot is at least partially occluded by the movable gate so that the selected second arch-wire which is carried and enclosed within the center level arch-wire slot is only axially movable within the center level arch-wire slot, and the selected second arch-wire exerts a first order of movement, a second order of movement and a third order of movement upon each individual tooth without exerting the same first order of movement, the same second order of movement and the same third order of movement upon any adjacent tooth; monitoring first order of movement, the second order of movement and the third order of movement of each individual tooth from the intermediate location and intermediate orientation toward the desired final location and the desired final orientation; determining when each individual tooth has moved in a desired first order, second order and third order of movement to a neutral position relative to the selected second arch-wire within the arch-wire slot and into the desired final location and the desired final orientation; and removing the selected second arch wire, the respective bracket body inserts, bracket bodies and the bracket bases from the patient's teeth.

A still further aspect of the inventive method includes the step of adjusting the orientation of the bracket body relative to the respective bracket base by at least partially removing the bracket body insert from the arch wire slot and thereafter pivoting the respective bracket body relative to the respective bracket base into a new second desired orientation, and then reinstalling the bracket body insert to positionally secure the bracket body to the bracket base in the new second desired orientation, and thereafter inserting the arch wire into the arch wire slot.

An even still further aspect of the present invention is an orthodontic bracket apparatus and method for treating a malocclusion wherein the bracket body insert is secured in place relative to the bracket body and the bracket body base by a removable pin that extends through a hole defined in the bracket body insert and in the bracket body.

These and other aspects of the present invention will be discussed in greater detail hereinafter.

BRIEF DESCRIPTION OF THE DRAWINGS

Preferred embodiments of the invention are described, below, with reference to the following accompanying drawings.

FIG. 1 is an orthographic side view of a prior art orthodontic bracket showing a high torque couple and at least one of the known deficiencies in such brackets.

FIG. 2 is an orthographic side view of a second prior art orthodontic bracket showing neutral torque couple and at least one of the known deficiencies in such brackets.

FIG. 3 is an orthographic side view of a third prior art orthodontic bracket showing a low torque couple and at least one of the known deficiencies in such brackets.

FIG. 4 is a perspective side, end, and top view of the present orthodontic bracket.

FIG. 5 is an orthographic, artistic representation of a tooth showing the directions of the first, second and third orders of movement.

FIG. 6 is an orthographic side view of the orthodontic bracket of FIG. 4 expressing a low torque couple.

FIG. 7 is an orthographic side view of the orthodontic bracket of FIG. 4 expressing a neutral torque couple.

FIG. 8 is an orthographic side view of the orthodontic bracket of FIG. 4 expressing a high torque couple.

FIG. 15 is an orthographic plan view of the bracket base showing the dovetail slot.

FIG. 16 is a perspective top, side and end view of the bracket base of FIG. 15.

FIG. 24 is a greatly enlarged and simplified, side elevation view which illustrates the cooperation of an arch wire of the present invention in combination with an arch wire slot having the non-rectangular quadrilateral shape.

FIG. 25 is a greatly enlarged and simplified, side elevation view of an orthodontic bracket, and which illustrates the cooperation of the new arch wire as illustrated, with an arch wire slot having a rectangular shape as illustrated.

FIG. 26 is a greatly enlarged and simplified, side elevation view of an arch wire of the present invention cooperating with an arch wire slot having the non-rectangular quadrilateral shape as illustrated.

FIG. 32 is an orthographic anterior surface view of the instant orthodontic bracket attached to a patient's tooth and showing alignment of the bracket on the tooth while maintaining center level arch wire slot lineup.

FIG. 33 is an orthographic anterior surface view of the instant orthodontic bracket attached to a patient's tooth and showing alignment of the bracket on the tooth while maintaining center level arch wire slot lineup.

FIG. 34 is an orthographic anterior surface view of the instant orthodontic bracket attached to a patient's tooth and showing alignment of the bracket on the tooth while maintaining center level arch wire slot lineup.

DETAILED DESCRIPTION OF THE PREFERRED EMBODIMENTS

Figure 10:
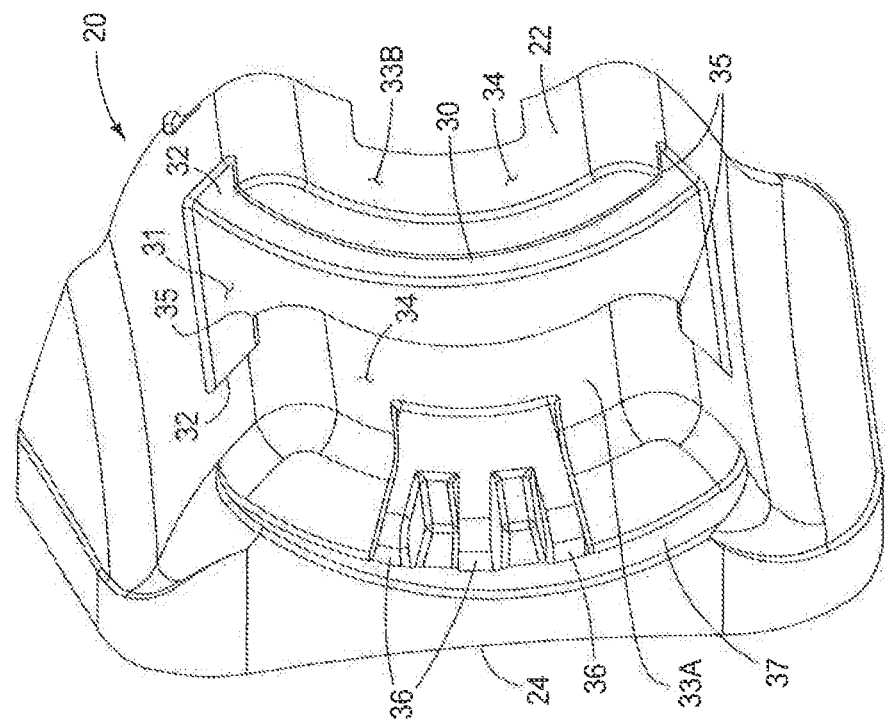
FIG. 10 is a perspective side and top view of the bracket base of FIG. 9, showing the dovetail slot.

This disclosure of the invention is submitted in furtherance of the constitutional purposes of the U.S. Patent laws to "promote the progress of science and useful arts" (Article I, Section 8).

The first form of the present invention is generally indicated by the numeral 10 in FIG. 4 and following. For purposes of the present invention, it will be understood that the various forms of the invention, as described, hereinafter, will be used to implement a multiple-step orthodontic treatment method, regimen or plan, which is provided by a clinician to treat one or several orthodontic anomalies which a patient possesses. The orthodontic bracket 10 of the present invention is releasably affixed by means of a suitable adhesive or other means to a patient's tooth 11 (FIG. 5) and in particular to the anterior facing surface 12 thereof. The orthodontic bracket 10, in its various forms, will be discussed, hereinafter, and when used in combination with an arch wire 90, and other orthodontic appliances as will be described, is operable to provide varying degrees of torque, and/or other forces, and which, in combination, corrects the orthodontic anomaly that the tooth 11 of the patient possesses. The force applied to the tooth 11 may be in the form of a multiplicity of selective torque expressions which individually, and forcibly act upon a patient's tooth 11. The patient's tooth includes a root 11A, a crown 11B and defines a longitudinal axis 11C. For purposes of this patent application the term "torque expression" as used, hereinafter, is defined as a force which provides rotation of a patient's tooth 11 around the X axis, that being the axis which lies in the mesial/distal direction. In particular, the orthodontic bracket 10 of the present invention can be employed to achieve first, second and third order movements 13, 14 and 15 respectively as seen in FIG. 5, without a clinically predetermined distortion, manipulation, bending, twisting and/or other rotation of the arch wire 90 away from/out of an original configuration that generally corresponds to the patient's dental arch (not shown) or the often repeated replacement of the same arch wire 90 with different sizes of arch wires 90 during the orthodontic treatment of the patient. Other forces, of course, can be applied to the patient's tooth 11 by other devices, and means, as will be described, hereinafter. Further, the treatment of a patient throughout the multiple step orthodontic treatment regimen may proceed to completion without the removal of a bracket base 20, as will be described, hereinafter, from the patient's tooth 11, although individual bracket bodies 40 which are releasably mounted in a sequential manner on the bracket base 20 may be periodically adjusted and/or replaced with a multitude of other clinician selected bracket bodies 40 during the treatment period based upon the clinical judgment of the treating clinician. The present invention 10 provides a novel means by which a clinician, by utilizing an assortment of different bracket bodies 40, and which can operably and matingly cooperate with the bracket base 20, and an assortment of bracket body inserts 100, as will be described, achieves first 13, second 14 and third 15 order movements of a tooth 11 of a patient, and thereby considerably shortens patient treatment times, and also achieves superior treatment results. The present invention also provides increased patient comfort in a manner not possible, heretofore, by utilizing the prior art appliances or practices which are known and are most familiar to the treating clinician.

Tooth 11 movement is defined relative to three planes in space. In this regard, movements in these respective planes are categorized as first order, second order and third order movements, that being 13, 14 and 15, respectively. As seen in FIG. 5, first order movements 13 are commonly thought of as rotation and/or in and out movements. This refers to movements that can be viewed from the occlusal perspective. On the other hand, second order movements 14 are often referred to as tipping, and can be viewed from a buccolingual or labiolingual perspective. These include movements in the occlusal-gingival direction, or tipping about the buccolingual or labiolingual axis. As a general matter, rotation about the aforementioned axes would typically result in a tipping of the root 11A or crown 11B of a patient's tooth 11 in a mesial or distal direction. The second order movements 14 are used for paralleling of the roots of the respective teeth 11, as well as elevating or depressing a given tooth. Finally, third order movements 15, and which are commonly thought of as "torque" can be viewed from a mesial-distal perspective, or a buccolingual cross-section. Third order of movements 15 typically refer to movements about the mesial-distal axis. This particular movement is often important when attempting to achieve proper incisor, or labiolingual or buccolingual inclination. First, second and third order movements, again are best seen in FIG. 5, and are indicated by the numerals 13, 14 and 15, respectively.

Figure 9:
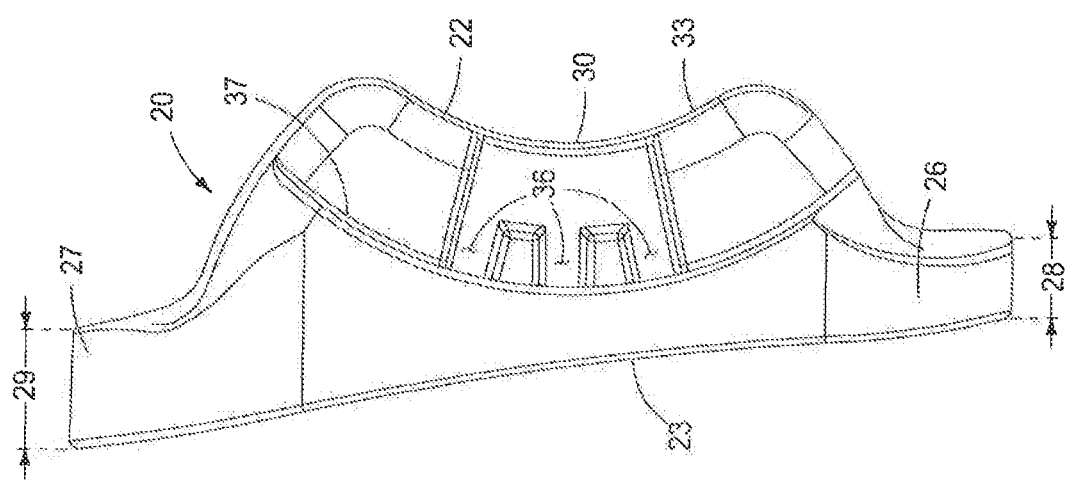
FIG. 9 is an orthographic side view of the bracket base.
Figure 12:
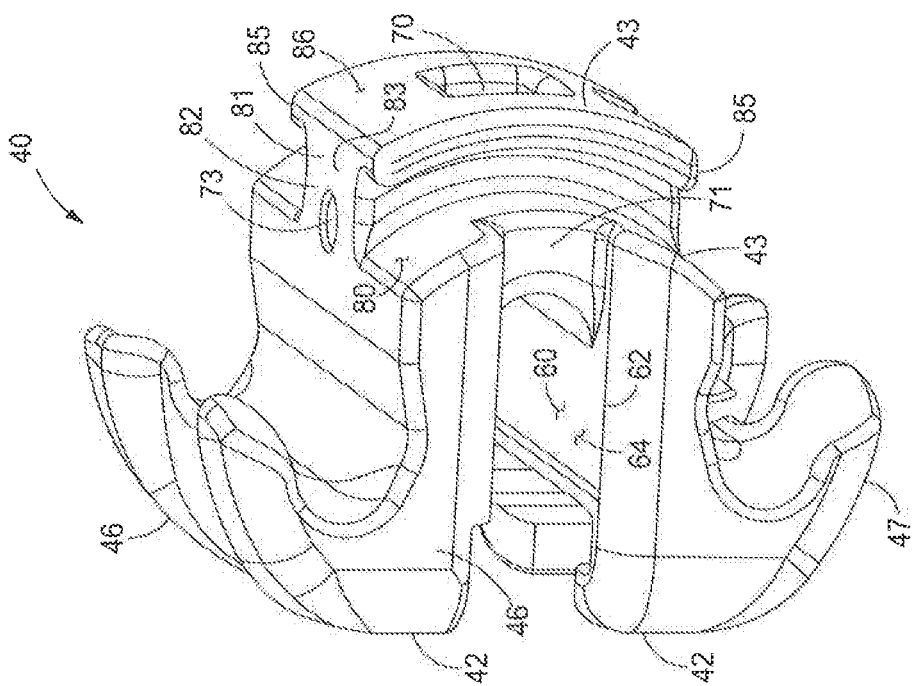
FIG. 12 is a perspective side and end view of the bracket body of FIG. 11.

In the first form of the invention as seen in FIGS. 4, 9 and 10, the orthodontic bracket 10 includes a bracket base 20, which has a main body 21 and which defines an anterior facing surface 22; a posterior facing surface 23; and which further has a peripheral edge 24. The posterior facing surface 23 is typically affixed to the anterior facing surface 12 of the patient's tooth 11 by a suitable adhesive. (not shown). The bracket base 20 has a posterior facing surface 23 that has a variable thickness dimension (FIG. 9) between the anterior facing surface 22 and the posterior facing surface 23, such that a first thickness dimension 28 at a first edge portion 26 is different from a second thickness dimension 29 at an opposing second edge portion 27. The differing thickness dimensions 28, 29 between the opposing edge portions 26, 27 is linear, causing the posterior facing surface 23 of the bracket base 20 to be angled preferably between about 6.5° to about 8.5°, and most preferably about 7.5°. The angulation allows the treatment provider to select, and customize a predetermined amount of torque which can then be exerted on the patient's tooth 11 during a given predetermined orthodontic treatment regimen. During fabrication of the bracket base 20, the material thickness of the bracket base 20 can be further altered if determined necessary by the clinician. The angulation of the posterior surface 23 of the bracket base 20 provides a clinician with greater flexibility to address orthodontic anomalies for patients having treatment regimens which are unique. Further, a 180° rotation of the bracket base 20 relative to the patient's tooth 11, (prior to attachment thereto) reverses the angulation of the bracket base 20 and materially alters the available angular positions of the bracket body 40 relative to the bracket base 20, and further broadens the available torque options available to a clinician when determining a treatment regime.

Referring now to FIG. 10, the first form of the invention 10 and more specifically the anterior facing surface 22, of the bracket base 20 includes a coupling portion or region which is generally indicated by the numeral 30. The coupling portion or region 30 is defined, in part, by a curved dovetail-shaped slot 31 which is illustrated in FIG. 10 as being substantially concavely shaped. However, and while the form of the invention, as illustrated, shows a concavely shaped dovetail-shaped slot, it is equally feasible that a form of the invention may be fabricated and where the curved dovetail-shaped slot 31 assumes a convexly-curved or a substantially planar shape. Therefore, the invention should not be limited to that which is illustrated. It should be recognized, therefore, that a curved dovetail-shaped slot either of convex, concave, and/or potentially planar arrangements may be equally employed in the fabrication of the present invention. The described coupling portion 30 renders this first illustrated bracket base 20, a "universal" base, and which may be utilized with a multiplicity of bracket bodies 40 as will be described, hereinafter.

In the arrangement as described, the bracket base 20 can be employed with bracket bodies 40 which employ passive ligation, active ligation, or conventionally tied brackets. In view of this feature, a clinician no longer has to remove the bracket base 20 when replacing orthodontic brackets during the implementation of an orthodontic treatment regimen. Rather, a clinician must only remove the bracket body 40 from the coupling portion 30, of the bracket base 20 and then reattach an alternative bracket body 40 which will achieve the clinician selected benefits which are to be employed in the implementation of the multiple step orthodontic treatment regimen. As another option, the clinician may only need to adjust the orientation of the bracket body 40 relative to the bracket base 20.

As earlier discussed, the bracket base 20 can stay affixed on the tooth 11 during the entire time of the orthodontic treatment thereby expediting the treatment, and making the overall treatment regimen much more comfortable for the patient. The curved dovetail-shaped slot 31 is defined, at least in part, by a pair of spaced sidewalls 32. Additionally, the coupling portion 30 is defined, at least in part, by a centrally located, and elevated region 33 having opposite sides, here identified as 33A and 33B, respectively, and which are located on the opposite sides of the curved dovetail-shaped slot 31. The centrally elevated regions 33A and 33B, respectively, each have a curved upwardly facing surface 34 having the same curvature as that of the curved dovetail-shaped slot 31. Each of the centrally elevated regions 33 includes inwardly extending flange portions 35, and which provide a means for slidably and matingly capturing and cooperating with a moveable bracket body 40 as will be discussed in greater detail, hereinafter. Additionally, and formed in each of the centrally elevated regions 33, and extending downwardly through the curved upwardly facing surface 34 is a multiplicity of engagement regions which are generally indicated by the numeral 36. The engagement regions 36 are individually sized so as to matingly receive, and cooperate with, engagement portions 111, 112 of a bracket body insert 100 as will be described in greater detail, hereinafter. It will be noted from studying FIGS. 9 and 10 that the multiplicity of engagement regions 36 are disposed in a predetermined, spacial pattern which provides a convenient means for adjustably positioning the rotatable orientation of a bracket body 40 which moveably, and mating cooperates with the bracket base 20 so as to impart a given amount of torque or other force to an arch wire 90 which is received within an arch wire slot 60, and which is further defined by the individual bracket bodies 40 as will be described, below. Arcuate side recesses 37 are defined in each opposing side 26, 27 of the bracket base 20. The arcuate recesses 37 communicate with the anterior facing surface 22 so that the rounded arc portion of each recess 37 opens opposite the posterior surface 23 of the bracket base 20. The arcuate recesses 37 are configured to carry/engage with flange portions 113 of bracket body insert 100 as will be discussed hereinafter, and are further configured to prevent/reduce buildup of calculus within the engagement regions 36 defined in the bracket base 20.

The orthodontic bracket 10 as illustrated in FIGS. 4 and 6-8, includes a moveable bracket body 40, and which is borne on, or moveably and matingly cooperates with, the bracket base 20. In this regard the bracket body 40 has a main body 41 which is defined, at least in part, by an anterior facing surface 42, and an opposite, posterior facing surface 43. Still further, the bracket body 40 is defined by opposite first (mesial), and second (distal) sides, 44 and 45, respectively, and which are further located at a predetermined distance, one relative to the other. Still further the bracket body 40 includes a superior facing surface 46, and an opposite, inferior facing surface 47. The superior and inferior facing services 46 and 47, define respective tie wings which are well known in the art. As seen in FIGS. 4 and 6-8, the bracket body 40 mounts a moveable gate which is generally indicated by the numeral 50, and which is well known in the art. The moveable gate 50 is operable to reciprocally travel or move along a defined path of travel 51, between a first, down or open position 52; and a second, up, or closed/occluding position 53, relative to an arch wire slot 60 which is further defined by the bracket body 40, and which is illustrated in the drawings. The gate 50 which moveably cooperates with the anterior facing surface 42, of the bracket body 40, is operable to selectively retain an arch wire 90, as will be discussed below, within a transversely disposed arch wire slot which is generally indicated by the numeral 60.

Figure 11:
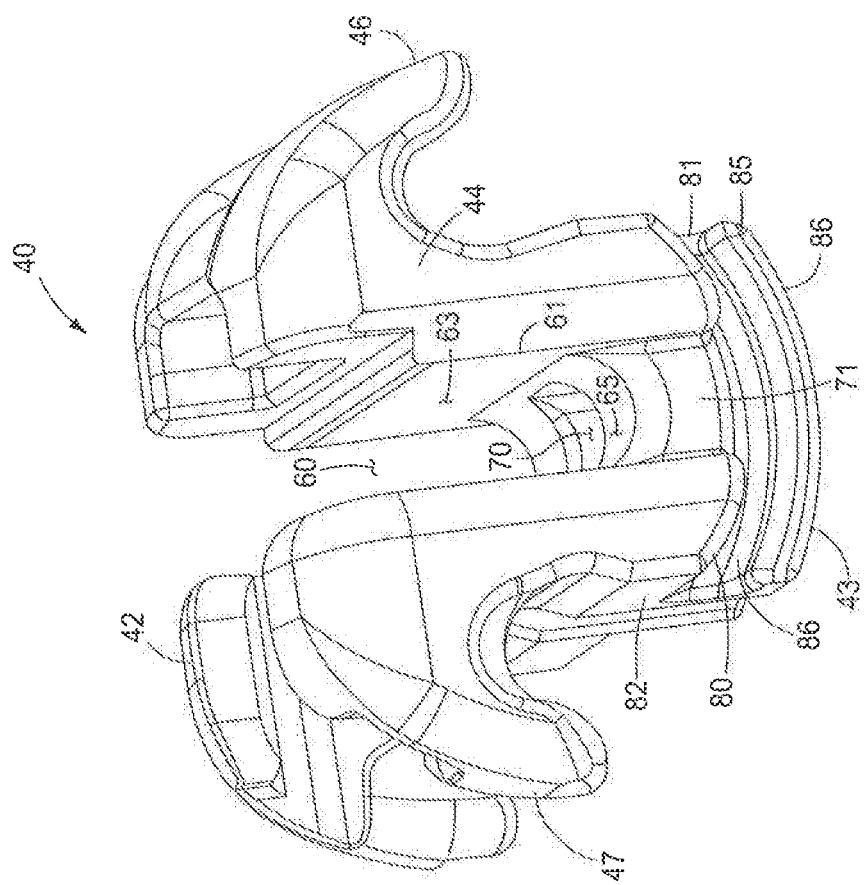
FIG. 11 is a perspective top and side view of the bracket body showing the arch wire slot.

The transversely disposed arch wire slot 60 has a first end 61, which is located adjacent to the first, mesial side 44 of the bracket body 40, and an opposite, second or distal end 62, and which is adjacent to the second side 45. The arch wire slot 60 is defined, at least in part, by a top or superior surface 63, and an opposite, bottom or inferior surface 64. The top/superior 63 and bottom/inferior 64 surfaces which define, at least in part, the arch wire slot 60, are disposed in substantially parallel, spaced relation, one relative to the other. A height dimension 18 between the top/superior 63 and bottom/inferior 64 surfaces allows the arch wire slot 60 to receive an arch wire 90 as will be described, hereinafter. Still further, the bracket body 10 main body 41 defines a supporting or recessed wall 65 (FIG. 11) which extends between the top/superior and bottom/inferior surfaces 63 and 64 and is further disposed in generally parallel spaced relation relative to the posterior facing surface 55 of the movable gate 50 and has an archwire slot depth dimension 17 therebetween. The arch wire slot 60 has a center region and center which is indicated by the numeral 67 and the arch wire slot 60 is moveable in both the vertical and horizontal planes, as described below, when moveably coupled to the bracket base 20. This rotation of the arch wire slot 60 by movement of bracket body 40 in either of the vertical, or horizontal planes, is maintained about the center 67 of the arch wire slot 60 (See FIGS. 27, 28, 29).

The arch wire slot 60 has a generally, cross-sectional, quadrilateral shape which is defined by four corner angles which may be, but are not necessarily right angles. At least some of the corner angles may be rounded and have a given curvature or radius which enhances the strength of the bracket body 40. In one possible form of the invention, the cross-sectional shape of the arch wire slot 60 may take on the form of a parallelogram, and in another possible form of the invention, the cross-sectional shape of the arch wire slot 60 may take on the shape of a rhomboid. For purposes of this patent application, the definition of a parallelogram includes a structure or shape having opposite pairs of substantially parallel sides, and wherein the opposite pairs of parallel sides are each of substantially equal length. On the other hand, a rhomboid shape includes structures or shapes which have opposite pairs of sides that are substantially parallel in orientation, but the opposite pairs of sides each have different lengths. The center 67 of the arch wire slot 60 is aligned with level arch wire slot line-up 180, as seen in FIGS. 24-26. This feature of the invention provides significant benefits and advantages to a clinician who is employing the invention to correct an orthodontic malady. In the invention arrangement as seen in the drawings, it should be understood that the arch wire slot 60, as more fully described, below, has a predetermined cross-sectional dimension which is variable by means of various other structures such as by the use of a bracket body insert 100, as described, below.

The bracket body 40 has a posterior facing surface 43 that defines a complimentary, substantially uniformly curved surface which matingly, and moveably engages the coupling portion 30 of the bracket base 20. As earlier described, the coupling portion 30, of the bracket base 20, defines a curved dovetail-shaped slot 31, having a predetermined shape, and dimensions, and the posterior facing surface 43 of the bracket body 40 further includes a complimentary, uniformly curved surface 80, and a mating structure which moveably and matingly engages the coupling portion 30 of the bracket base 20 as seen in the drawings. This complimentary, substantially uniformly curved surface 80 which forms, at least in part, the posterior facing surface 43, moveably and matingly cooperates with the curved upwardly facing surface 34 of the centrally elevated region 33, and which further forms a feature of the coupling portion 30. The bracket body 40 also includes a curved male pin member 81 which forms, at least in part, the aforementioned mating structure, and which is made integral with the substantially uniformly curved posterior facing surface 80, of the bracket body 40, and which is further dimensioned for complimentary, slidable, matingly engageable receipt within the curved dovetail-shaped slot 31, and which is formed in the bracket base 20. This feature provides a means by which various bracket bodies 40 can matingly and moveably cooperate with the bracket base 20. This feature also allows the bracket base 20 to remain attached to the tooth 11 throughout the orthodontic treatment regimen or plan which is selected by a clinician. As should be understood, rotation of the bracket body 40 relative to the bracket base 20 is effective in moving the male pin member 81 along the curved dovetail-shaped slot 31 which is formed in the bracket base 20. The male pin member 81 is defined, at least in part, by a main body 82, which includes a central support post, or shaft region 83, and which further is located or otherwise received within the space that is defined between the flange portions 35 of the bracket base 20, and which further, in combination, form the centrally elevated region 33. The central support portion or shaft 83 has a distal end, and made integral with the distal end, is an enlarged, transversely disposed flange portion 85. The flange portion 85 has a width dimension which is less than a distance as measured between the sidewalls 32, and which individually form a portion of the curved dovetail-shaped slot 31 defined in the bracket base 20. Further, the same flange portion 85 has a thickness dimension which is less than a distance as measured between the flange portions 35, and the curved dovetail-shaped slot 31. In its curved configuration, the enlarged flange 85 has a complimentary, curved surface 86, and which has a curvature which is substantially similar to that which is provided for the curved dovetail-shaped slot 31. As dimensionally designed, the male pin member 81 matingly interfits or otherwise matingly cooperates and slides along the curved dovetail-shaped slot 31 thereby rendering the bracket body 40 at least partially rotatably moveable within the curved dovetail-shaped slot 31 and relative to the bracket base 20. Additionally, this feature provides a means by which the bracket body 40 can be readily positionally adjusted and/or detached from the bracket base 20, and be subsequently replaced with another form of a bracket body 40 in order to achieve additional clinical advantages desired by the treating clinician.

Figure 14:
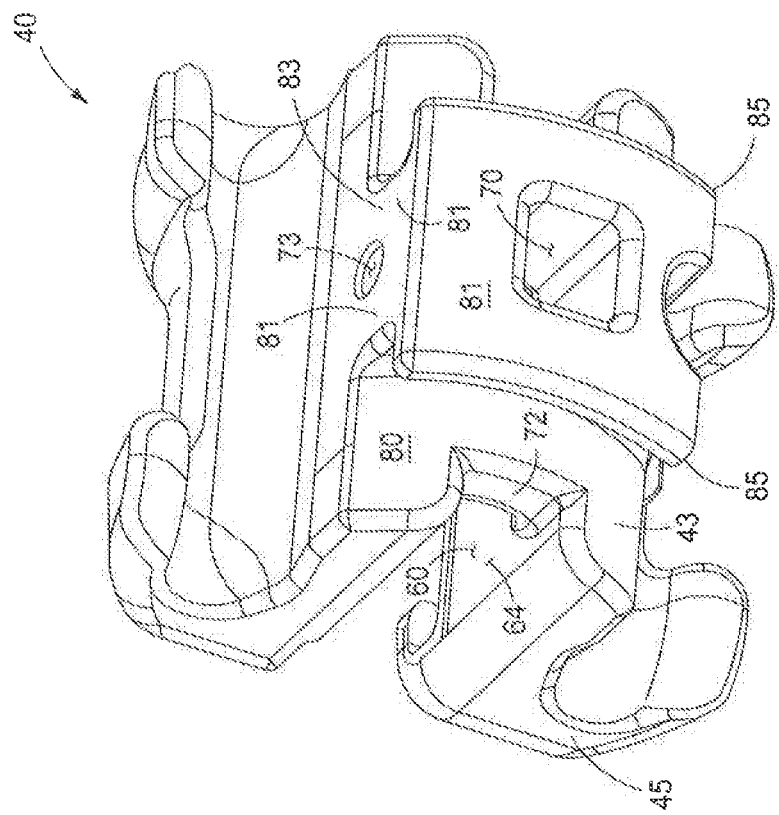
FIG. 14 is a perspective bottom and side view of the bracket body of FIG. 11 showing the dovetail engagement member.
Figure 13:
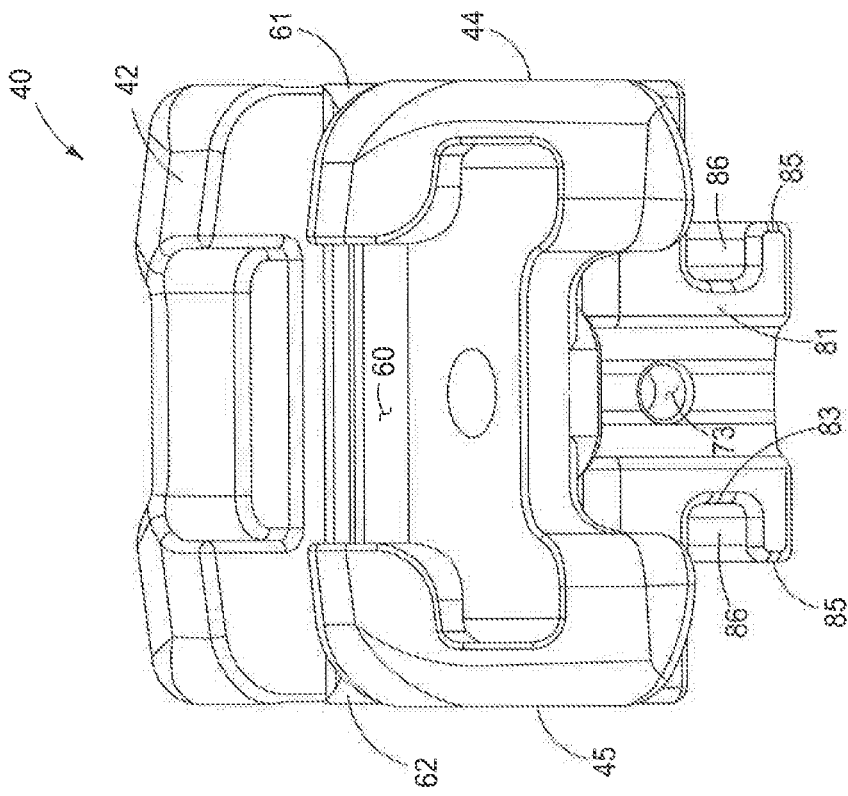
FIG. 13 is a perspective top and side view of the bracket body of FIG. 11.

A medial through passageway 70 is defined in the bracket body 40 communicating from the supporting wall 65 of the arch wire slot 60 to the complimentary curved surface 86 of the curved male pin member 81. (See FIGS. 11, 14). The medial through passageway 70 is configured and dimensioned to be releasably carried/engaged with a medial engagement member 118 of a bracket body insert 100. A transverse through hole 73 is further defined in the male pin member 81 spacedly adjacent the complementary curved surface 86, and extends from the superior facing side 46 of the bracket body 40 to the inferior facing side 47 of the bracket body 40, and further intersects the medial through passageway 70. The through hole 73 releasably carries a retention pin 120 therein. The retention pin 120, when engaged in the through hole 73 secures the bracket body insert 100 to the bracket body 40 and limits movement of the bracket body insert 100 relative to the bracket body 40 which allows for rotational movement of the bracket body 40 relative to the bracket base 20, but prevents removal of the bracket body 40 from the bracket base 20 without removal of the retention pin 120. The retention pin 120 may have a radially enlarged end portion (not shown) or other known feature (not shown) to prevent the retention pin 120 from passing completely through the transversely extending hole 73 and being lost or otherwise disengaging from its desired position within the transverse hole 73.

When the bracket base 20 is appropriately attached to the patient's tooth 11, and the bracket body 40 is attached thereto, the transversely disposed arch wire slot 60 has a given, predetermined orientation relative to the bracket base 20, and the arrangement as provided with this invention permits the individual torque expressions, here indicated as being first, second and third order movements 13, 14 and 15 respectively to be readily adjusted without significantly impacting the predetermined orientation of the transversely disposed arch wire slot 60. This is best seen by reference to FIGS. 6, 7 and 8. This is a significant advancement in orthodontic treatment inasmuch as the partial rotation of the bracket body 40 relative to the bracket base 20 does not materially displace the center 67 of the arch wire slot 60 while different torque expressions 13, 14, 15 are provided for moving and correcting the portion of the patient's tooth 11. This is a very significant and novel advantage over previously disclosed orthodontic appliances.

Figures 27, 28, 29:
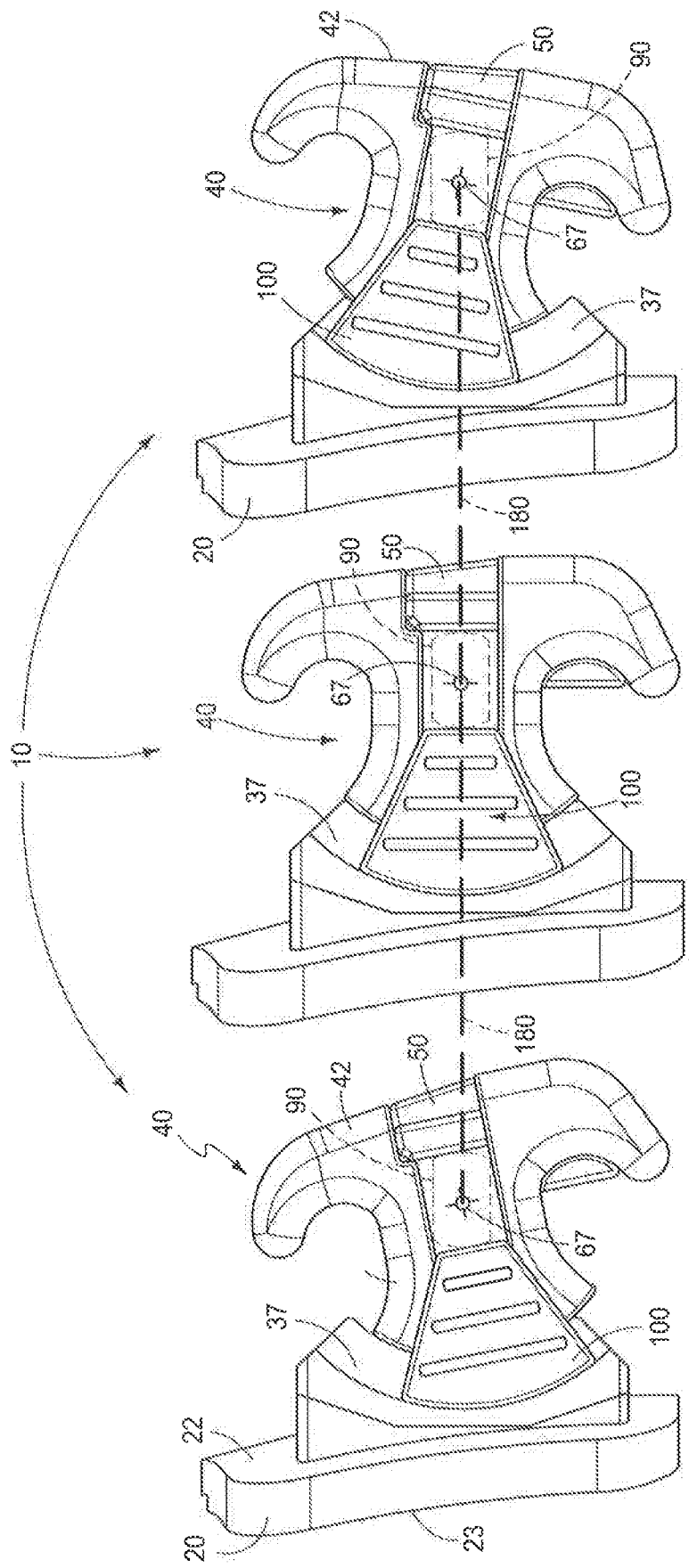
FIG. 27 is an orthographic side view of the instant orthodontic bracket showing the bracket body rotated to a low torque couple relative to the bracket base while maintaining center arch wire slot lineup.
FIG. 28 is an orthographic side view of the instant orthodontic bracket showing the bracket body rotated to a neutral couple relative to the bracket base while maintaining center arch wire slot lineup.
FIG. 29 is an orthographic side view of the instant orthodontic bracket showing the bracket body rotated to a high torque couple relative to the bracket base while maintaining center arch wire slot lineup.
Figure 30:
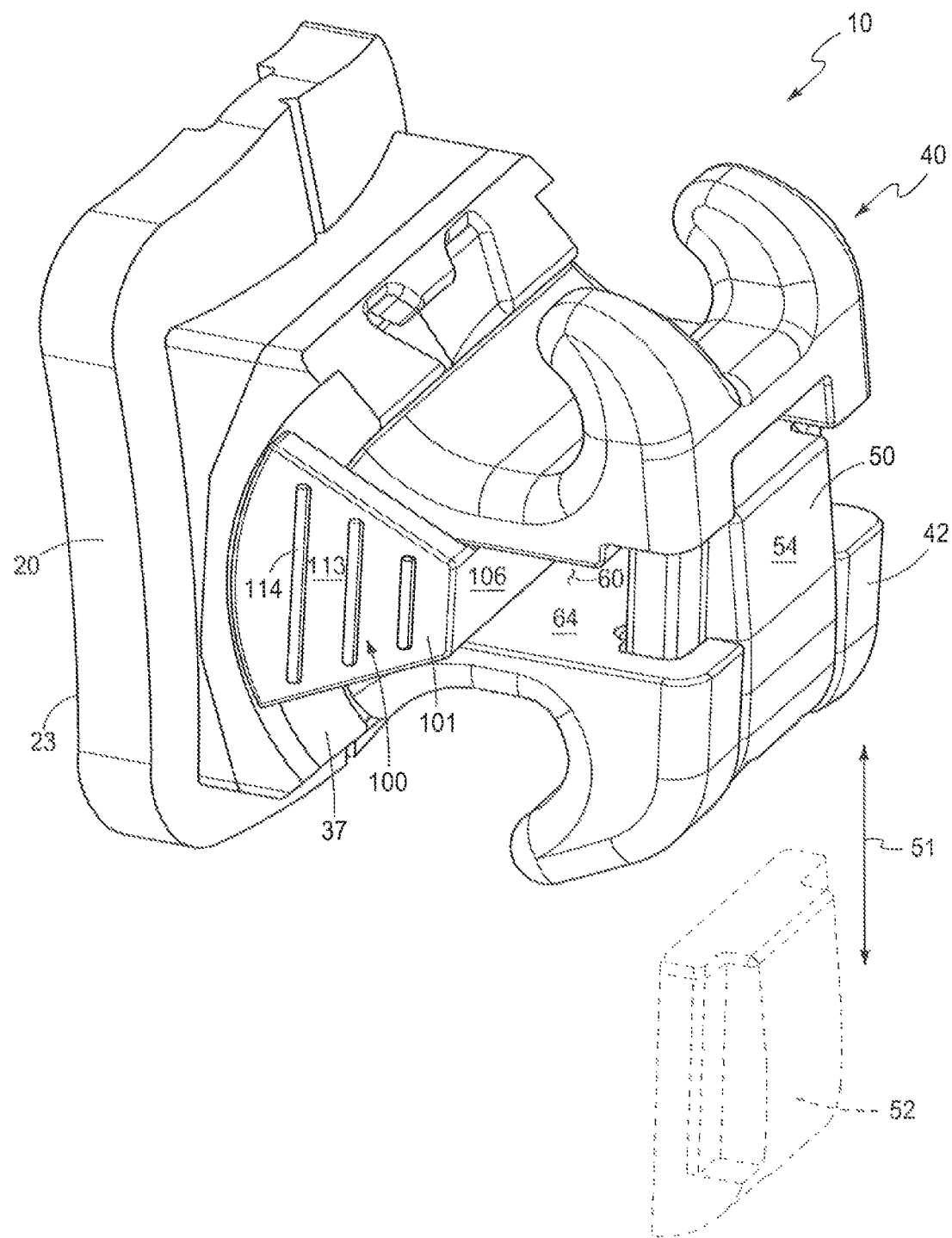
FIG. 30 is a perspective top, side and anterior view of a second embodiment of the instant orthodontic bracket apparatus.
Figure 31:
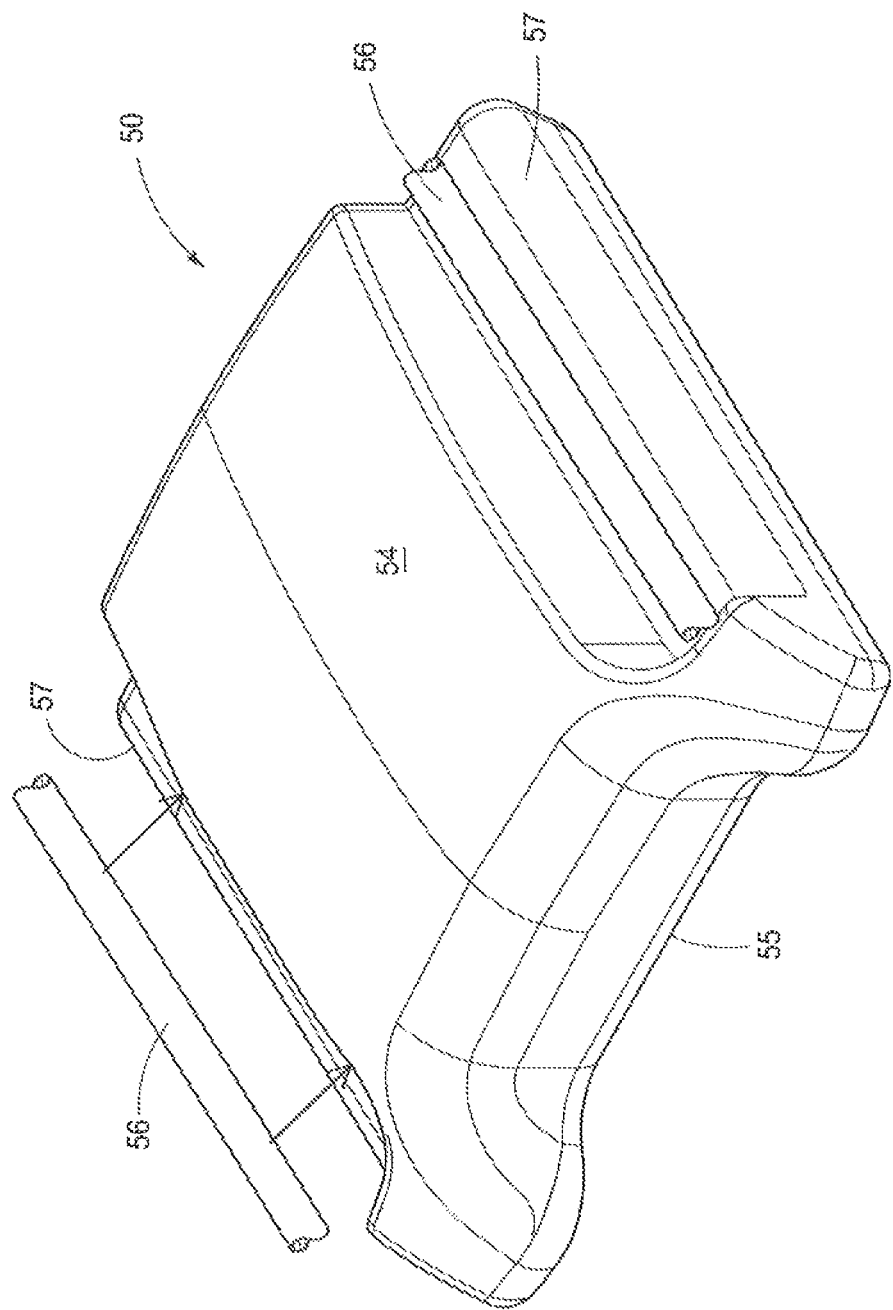
FIG. 31 is a perspective top, end and side view of the movable gate showing the rib thereon.

Another of the novel features of the present invention 10 relates to the fact that the new orthodontic arch wire 90 can be placed in, or otherwise substantially enclosed within, the passive ligating bracket 10 without substantial bending or intentional distortion or other manipulation and which has been a prevalent practice for clinicians for decades. Further, the treatment of a patient may proceed to completion without the removal of the bracket base 20 from the patient's tooth 11, although the bracket body 40 which is releasably mounted on the bracket base 20 may be positionally adjusted and/or replaced with other bracket bodies 40 during the treatment period based upon the clinical judgment of the treating clinician. The present invention 10 provides a novel means by which a clinician, by utilizing various means including different bracket body inserts 100, can readily adjust the cross sectional dimensions 17, 18 of the arch wire slot 60, to achieve first, second and third order movements 13, 14 and 15 of the tooth 11 of a patient, and thereby considerably shorten patient treatment times, achieving superior treatment results, and increase the patient's comfort in a manner not possible by utilizing the prior art appliances or practices which are known. Still further, the adjustable, passive ligating bracket 10 of the present invention further receives the arch wire 90, and is moveable in both the vertical and horizontal plane, and wherein the rotation of the arch wire slot 60 which is carrying the arch wire 90, in either the vertical or horizontal planes imparts simultaneous first, second and third order movements 13, 14 and 15, respectively, to the tooth 11 of the patient, and wherein movement of the arch wire 90 is substantially maintained about the center 67 of the arch wire slot 60. This feature is best shown in FIGS. 27-29 wherein regardless of the torque expression 13, 14, 15 being expressed by the bracket 10 upon the tooth 11. The arch wire slots 60 are maintained along a level line 180 which passes through the center 67 of each arch wire slot 60.

As noted previously, the arch wire slot 60 is defined, in part, by an anterior facing surface 106 of the bracket body insert 100 which is best seen in FIG. 4 by a superior surface 63, an inferior surface 64, so as to form a three sided arch wire slot 60 and is still further is defined, in part, by a posterior inwardly facing surface 55 of moveable gate 50. When the movable gate 50 is in a closed position (FIGS. 6-8) the arch wire slot 60 forms (in cross section) a four-sided quadrilateral shaped arch wire channel 60 bounded by the anterior surface 106 of the bracket body insert 100, the superior surface 63, the inferior surface 64 and the posterior inwardly facing surface 55 of the movable gate 50. The quadrilateral arch wire channel 60 further has four corner angles between and joining the adjacent surfaces 106, 63, 64 and 55 that may be, but are not required to be, right angles.

The passive ligating bracket 10 further utilizes or employs a moveable gate 50 which is slidably mounted on the anterior facing surface 42 of the bracket body 40, and rendered moveable relative thereto. The moveable gate 50 has an anterior or outside facing surface 54 which may be frictionally engaged by a clinician, and further has an opposite, posterior facing surface 55 which forms, at least in part, a portion of the four sided quadrilateral arch wire slot or channel 60, and which substantially encloses the arch wire 90 of the present invention. As seen in the drawings, the moveable gate 50 is operable to travel along the path of movement 51 between a first non-occluding or open position 52, to a second occluding or closed position 53. In the second occluding or closed position 53 the moveable gate 50 encloses, at least in part, a portion of the arch wire 90 of the present invention. Further, and when the bracket body 40 is moved to a given orientation relative to the bracket base 20, the enclosed arch wire 90 is operable to impart forces to the bracket body 40 so as to affect first 13, second 14 and third 15 order movement of the patient's tooth 11 upon which the passive ligating bracket 10 is mounted. The archwire 90 however is not positionally secured within the arch wire slot 60 and the arch wire 90 remains axially movable within the arch wire slot 60 so as to affect the desired tooth movement of the instant passive ligation bracket apparatus and method.

Figure 21:
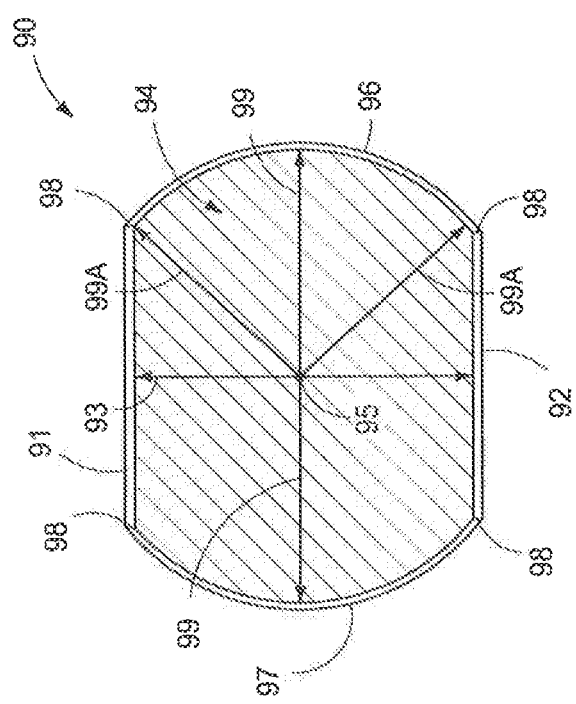
FIG. 21 is an orthographic cross sectional view of the arch wire.

As illustrated in the drawings, the orthodontic bracket 10, as described in the present invention, is operable to receive and cooperate with an arch wire 90, which is received within the arch wire slot 60. The arch wire 90 is a novel design, and is further defined by planar opposing opposite top (superior) 91 and bottom (inferior) 92 surfaces and opposing convexly curved anterior and posterior surfaces 96, 97, which connect the superior 91 and inferior 92 surfaces together, and which further form a substantially circular square, or circular rectangular cross-section. (See FIG. 21). In the arrangement as seen in the drawings, the arch wire 90 is received within the transversely disposed arch wire slot 60; and the bracket body 40, as illustrated, acting in combination with the arch wire 90, is adjustable along both the horizontal or vertical planes, so as to provide a multiplicity of selective torque expressions 13 through 15, respectively, and which forcibly act upon the patient's tooth 11, so as to move the respective tooth 11 in a fashion which achieves a clinically desirable orientation and benefit within the patient's mouth.

Figure 23:
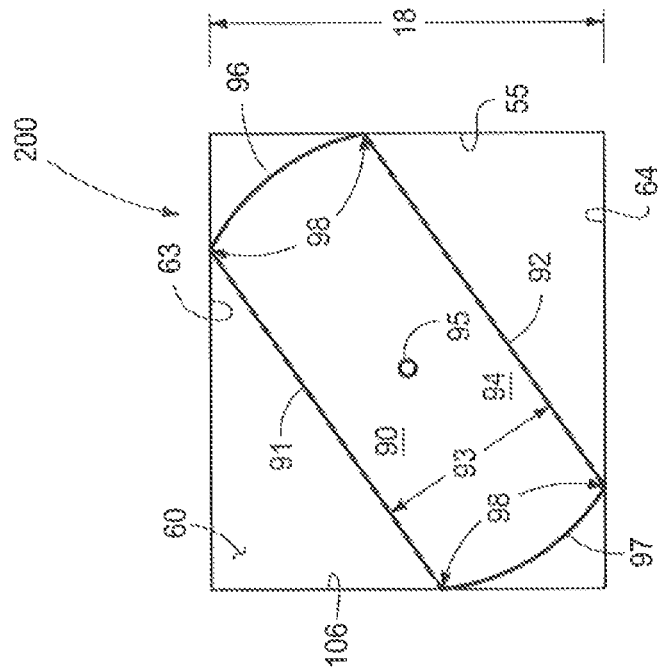
FIG. 23 is a second artistic representation of an orthographic cross section side view of the arch wire engaging with adjacent surfaces of the arch wire channel.
Figure 22:
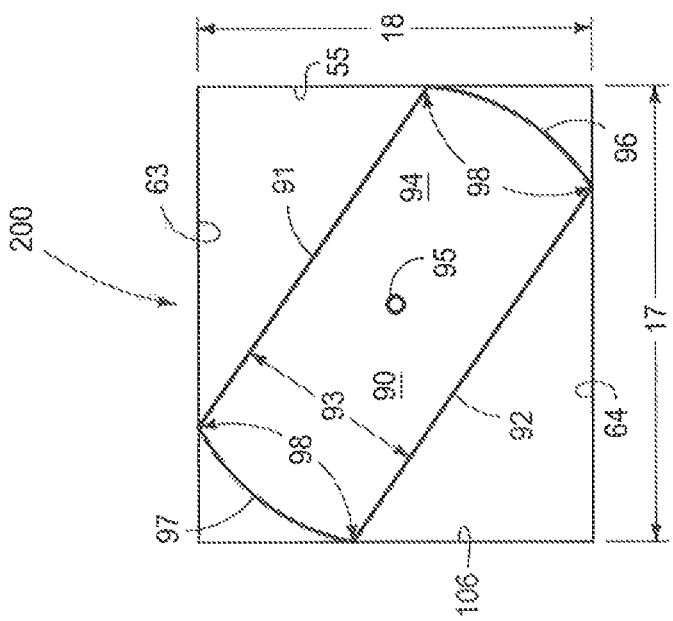
FIG. 22 is an artistic representation of an orthographic cross section side view of the arch wire engaging with adjacent surfaces of the arch wire channel.

Referring now to FIGS. 21-26 respectively, the arch wire 90 has a main body 94 which is defined, in part, by a longitudinal axis 95. The main body 94 has a generally planar superior facing surface 91, and an opposing, generally planar inferior facing surface 92. A thickness dimension 93 of the main body 94 is measured, between the generally planar superior and inferior surfaces 91 and 92, respectively on a line extending between the two surfaces 91, 92 and perpendicular thereto. Still further the main body 94 has an anterior, convexly curved surface 96; and an opposite convexly curved posterior facing surface 97 with a consistent diameter 99 therebetween measured along a line extending between the opposing convexly curved surfaces 96, 97 and passing through the center longitudinal axis 95. The two opposing convexly curved surfaces 96, 97 each have a consistent radius 99A as measured from the longitudinal axis 95 so that both convexly curved surfaces 96, 97 share the same center 95. The main body 94 further has a multiplicity of angulated edges or regions 98 which define the interconnections along the peripheral edges of the planar superior facing surface 91, the opposing planar inferior facing surface 92, and the two opposing convexly curved surfaces 96, 97. The predetermined thickness dimension 93 between a planar superior surface 91 and an opposing planar inferior surface 92 provides a convenient means for a clinician to exert predetermined amounts of variable torque so as to provide selective second and third order movement 14 and 15 to a patient's tooth 11, and while simultaneously maintaining first order control 13. The selective amount of torque is achieved by varying the thickness dimension 93. The thickness dimension 93 of any selected arch wire 90 is uniform along the entire length of the arch wire 90. The arch wire 90 as seen in FIGS. 22, 23 shows one type of arch wire configuration that can be utilized in order to generate very small, but precise amounts of torque so as to provide the final, finish movements of the patient's teeth 11 and which achieves superior tooth alignment. As seen in FIGS. 22 and 23, an enlarged, very fragmentary, and simple graphically depicted arch wire slot 60 having a square configuration is illustrated, and which is occluded by a moveable gate 50, only the posterior surface 55 of which is shown. The anterior facing convex surface 96 is positioned in closely spaced, juxtaposed relation relative to the posterior facing surface 55 of the moveable gate 50. Further, the convexly curved posterior facing surface 97 is located in an adjacent, juxtaposed relationship relative to the anterior facing surface 106 of the bracket body insert 100. As can be seen in the drawings, the various angulated edges or regions 98 are operable to engage both the superior surface 63 of the arch wire slot 60, and the inferior surface 64, thereof. Notwithstanding this engagement, it will be seen that the anterior facing, convexly curved surface 96 still permits the posterior facing surface 55 of the moveable gate 50 to pass thereby. It should be appreciated that as the thickness dimension 93 of the main body 94 is reduced, the amount of torque that the arch wire 90 can impart to the bracket body 40 is further reduced. Thus a clinician, by selecting various thicknesses 93 of arch wire 90, can deliver refined and selective amounts of torque in order to provide fine finish control and achieve superior tooth alignment and position in a manner not possible heretofore.

In the preferred embodiment the arch wire 90 preferably has a thickness dimension 93 between the two diametrically opposed planar superior and inferior surfaces 91, 92 respectively, of between approximately 0.010 mm and approximately 0.025 mm. Further still, in the preferred embodiment the arch wire 90 has a diameter dimension 103 measured on a line extending between the two diametrically opposed radially convexly curved surfaces 96, 97 and passing through the center 95 of the arch wire 90 of between approximately 0.0225 mm and 0.0300 mm.

Figure 17:
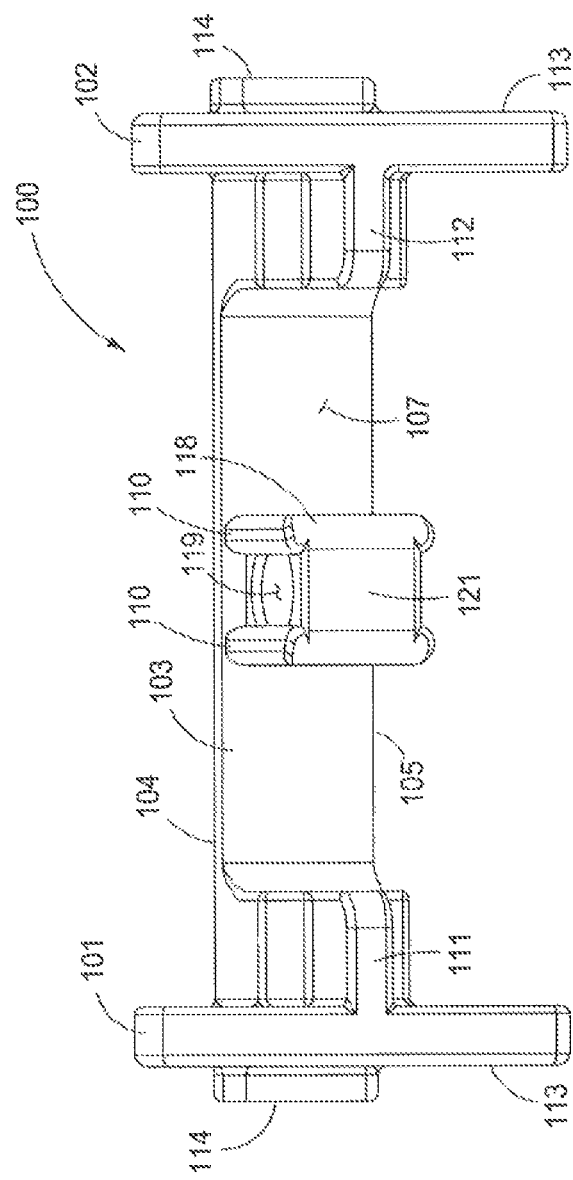
FIG. 17 is a perspective bottom view of the bracket body insert.
Figure 18:
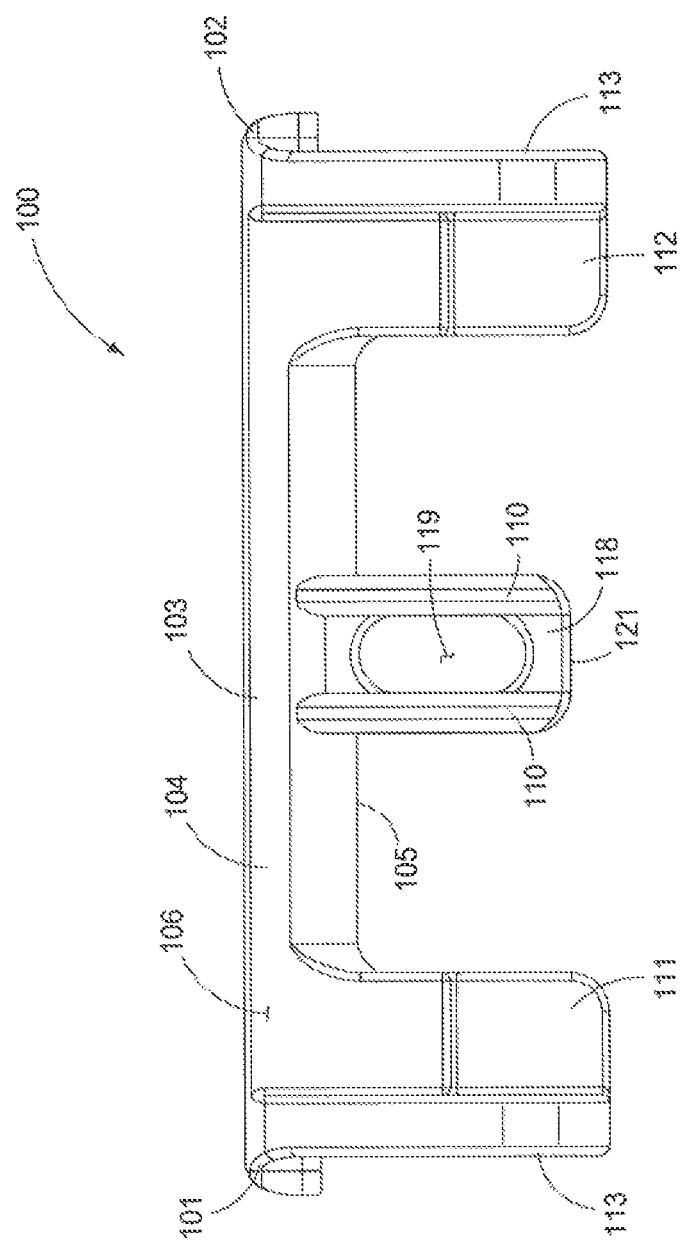
FIG. 18 is an orthographic side view of the bracket body insert.
Figure 19:
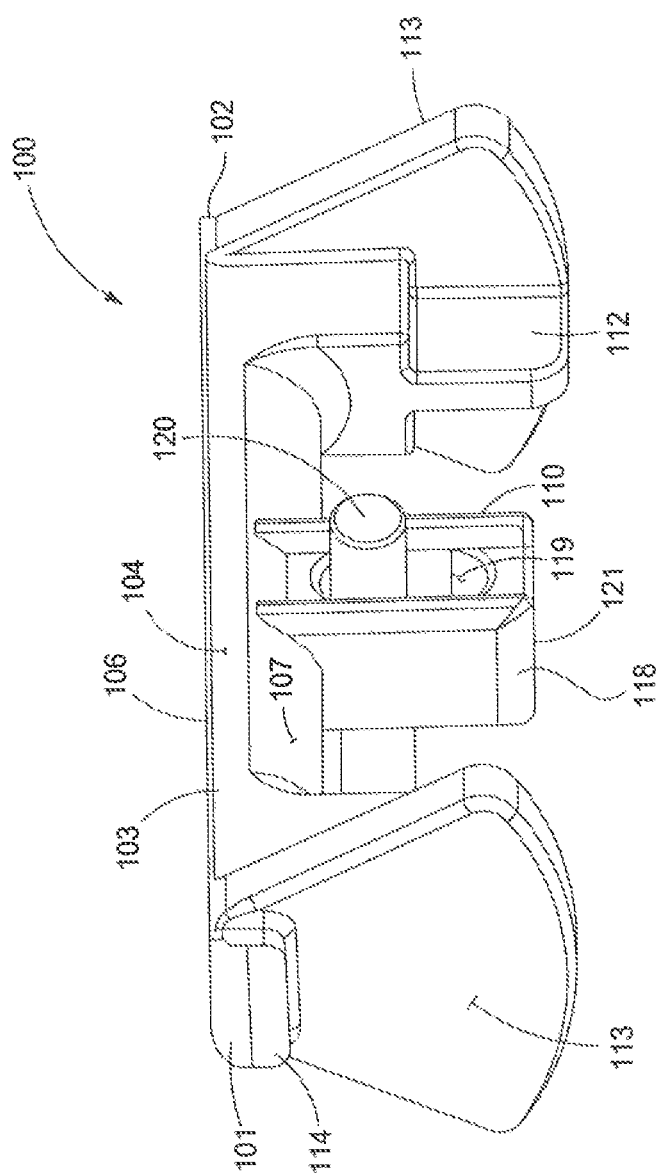
FIG. 19 is a perspective side and end view of the bracket body insert and securing pin.
Figure 20:
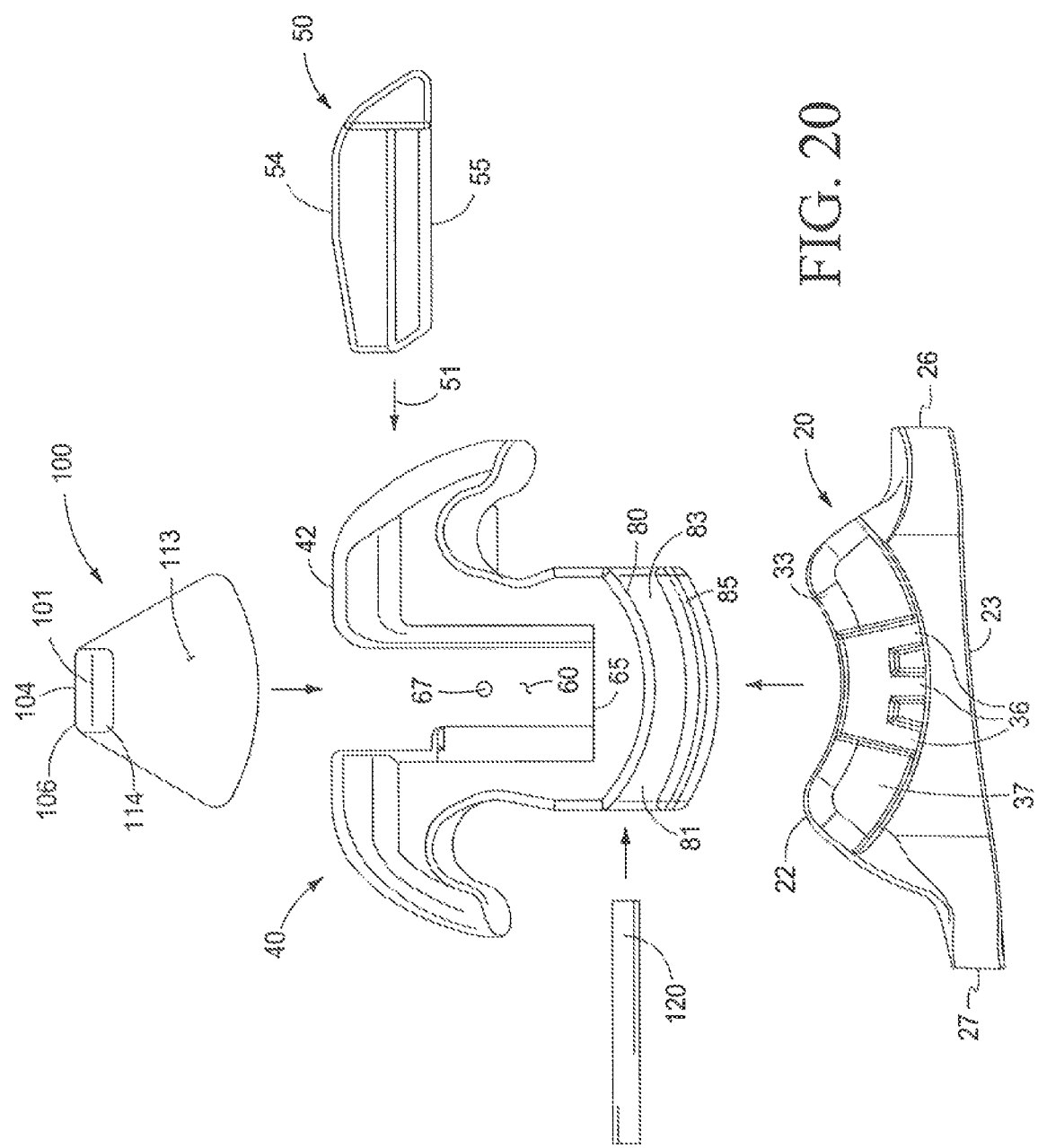
FIG. 20 is an orthographic exploded view of the instant orthographic bracket showing the components separated from one another, but aligned for engagement.

The present invention 10 further includes a bracket body insert 100, and which is best seen by reference to FIGS. 17-19. The bracket body insert 100 is received within the arch wire slot 60, at a time before the arch wire 90 is received in the arch wire slot 60. The bracket body insert 100 has a first end 101, and an opposite second end 102. The bracket body insert 100 further has an elongated main body 103, which is defined by a top or superior facing surface 104, and an opposite, bottom or inferior facing surface 105. Still further, the anterior facing surface 106 of the main body 103, forms a rear (anterior facing) wall of the arch wire slot 60, and an opposite, posterior facing surface 107, rests in juxtaposed resting relation on, or against, the supporting or recessed wall 65, and which is defined by the bracket body 40. The bracket body insert 100 has a height dimension as measured between the top and bottom surface 104 and 105 respectively, and which is less than the height dimension 18 between the planar superior and inferior surfaces 63 and 64, and which defines, at least in part, the arch wire slot 60. The height dimension of the main body 103 allows the main body 103 to be received within the arch wire slot 60, and further rests in mating receipt thereagainst the supporting or recessed wall 65, and which is further formed by the bracket body 40. It should be understood that the main body 103 of the bracket body insert 100 may have a substantially constant thickness dimension as measured between the anterior and posterior facing surfaces 106 and 107, or may further have a variable dimension. (i.e. angled from one end 101 to the opposing end 102). As such, the bracket body insert 100 provides a convenient means for selectively adjusting the cross-sectional dimension of the resulting arch wire slot 60 so as to provide some of the benefits of the present invention, and which include, among others, providing an orthodontic bracket 10 which provides first, second and third order movements 13, 14, and 15 for a patient's tooth 11, and without a clinically predetermined manipulation of the arch wire 90, which is received in the transversely disposed arch wire slot 60.

The bracket body insert 100 has first and second flange portions 113, which are located at the first and second ends 101 and 102 of the bracket body insert 100. In particular, the first and second flange portions 113 extend outwardly beyond the first and second sides 44 and 45 of the bracket body 40 so as to engage in the side recesses 37 defined in the bracket base 20 as discussed previously, and further provide a convenient means by which a clinician, not shown, may easily visually identify the bracket body insert 100 such that it may be positioned appropriately or otherwise adjusted as will be discussed in further detail below. Each of the flange portions 113 has an outside facing surface which has thereon a protuberance 114, which allows a clinician to use a tool, such as, but not limited to, tweezers or the like, to conveniently exert sufficient force so as to remove, at least partially, the bracket body insert 100 from the arch wire slot 60. The bracket body insert 100 further has a first engagement portion 111 that extends normally, downwardly, relative to the posterior surface 107 adjacent the first end 101 of the bracket body insert 100. The first engagement portion 111 is configured and dimensioned so as to be slidably received within a first passage 71, and which is formed in the first mesial side 44 of the bracket body 40 adjacent the archwire slot 60. Still further, the bracket body insert 100 includes an opposing second engagement portion 112 and which further is configured and dimensioned to be received in a second passage 72 which is formed in the second distal side 45 of the bracket body 40 adjacent the arch wire slot 60. The first engagement portion 111 has a distal end which is operable to be matingly received within one of the multiplicity of engagement regions 36, and which are formed in the bracket base 20. Similarly, the second engagement portion 112 has a distal end portion that is operable to be matingly engaged within one of the multiple of engagement regions 36 which are formed in the bracket base 20.

The bracket body insert 100 further carries the integral elongated rectilinear medial engagement member 118 that extends generally perpendicularly outwardly from the posterior surface 107 of the elongated main body 103 and generally medially between the first and second engagement portions 111, 112 respectively. The medial engagement member 118 is configured and dimensioned to be axially releasably received within the passageway 70 defined in the bracket body 40 and has a distal end portion 121 opposite the elongated main body 103 and further defines an elongated hole 119 (FIG. 18) that aligns with the transverse through hole 73 defined in the male pin member 81 of the bracket body 40. Friction ribs 110 on elongate edge portions of the medial engagement member 118 stabilize the bracket body 40 relative to the bracket base 20 to prevent any "play" or "wiggle" therebetween which would have the effect of negating the precision and accuracy of the present invention and decrease/negatively affect the precise predetermined forces, and torque couples, exerted upon the patient's tooth 11 by the instant orthodontic bracket apparatus and method.

As will be recognized, when the main body 103 of the bracket body insert 100 is inserted within the arch wire slot 60, the medial engagement member 118 is received in the medial passageway 70 and the distal ends of the first and second engagement portions 111, 112 are received within one of the multiplicity of engagement regions 36 which are individually formed in the bracket base 20, and thereby is effective in fixedly, rotatably positioning the bracket body 40 in an appropriate rotatable orientation relative to the bracket base 20. Further, the flange portions 113 engage in the side recesses 37 of the bracket base 20 to provide support and prevent/inhibit calculus buildup/accumulation of calculus and/or food debris. Insertion of the securing pin 120 into the transverse through hole 73 so as to pass through the mail pin member 81 of the bracket body 40 and through the elongated hole 119 defined in the medial engagement member 118 positionally secures the bracket body insert 100 and the orientation of the bracket body 40 relative to the bracket base 20.

It will be recognized from the figures that the elongated hole 119 defined in the medial engagement member 118 allows the bracket body insert 100 to be partially withdrawn/removed from the archwire slot 60 effectively causing the first and second engagement portions 111, 112 respectively to be disengaged from the respective engagement regions 36 defined in the bracket base 20, which responsively allows the respective bracket body 40 to be rotatably moved/adjusted relative to the respective bracket base 20, without the need to completely remove the retention pin 120 carried in the transverse through hole 73 and communicating through the elongated hole 119 defined in the medial engagement member 118 of the bracket body insert 100. This feature provides for ease of adjustability, and prevents unintentional disengagement, and possible loss, of bracket bodies 40 in the event an archwire 90 were to be broken, or the like.

Further, and as will be recognized from the drawings, the main body 103 of the bracket body insert 100 can be fabricated in different thickness dimensions, and consequently provides a means by which the orthodontic bracket 10 can be supplied, and which may have a clinician selected and customizable torque expression to affect the movement of a patient's tooth 11.

Further still, it will be recognized the bracket body insert 100 can appropriately position the bracket body 40 in multiple possible, different angular orientations relative to the bracket base 20. This provides a multiplicity of treatment options for a clinician employing the same orthodontic bracket 10 to correct the malocclusion of a patient's tooth 11. These multitude of positions or orientations may constitute the application of low, medium or high torques to the patient's tooth 11 to achieve the clinical benefits that the treating clinician has established for the patient. When this feature is combined with a bracket base 20, which has an angular posterior surface 23, a multitude of treatment options have now been made available to a treating clinician which were unavailable, heretofore.

In one of its broadest aspects, the present invention relates to an orthodontic bracket which includes a bracket base 20, and which further is releasably affixed to a tooth 11 of a patient undergoing a multiple step orthodontic treatment method, regimen or plan as prescribed by a clinician. The bracket base 20 remains affixed to the tooth 11 of the patient during the duration of the orthodontic treatment regimen, and the orthodontic treatment regimen selected by the clinician may require that the clinician impart a first, second and/or third order of movement 13, 14 and 15, respectively, to the tooth 11 of the patient undergoing the orthodontic treatment regimen. The invention 10 allows for the use of a multiplicity of bracket bodies 40, and which are selected by the clinician, and which further individually, sequentially, releasably, moveably and matingly cooperate with the bracket base 20 during a predetermined selective time period during the duration of the orthodontic treatment regimen, and which additionally individually and/or collectively facilitate the delivery of a clinician selected amount of force to the tooth 11, and which is undergoing the orthodontic treatment regimen so as to impart the first, second and/or third orders of movement 13, 14 and 15, respectively, and which are selected by the clinician to achieve a clinically desired amount of movement of the patient's tooth 11. In the arrangement as seen in the drawings, the bracket base 20 as provided has, an angled posterior surface 23 between a first edge portion 26 and an opposing second edge portion 27, so as to provide a clinician with an additional or a reduced amount of torque, which may be exerted on the patient's tooth 11 during the orthodontic treatment regimen that is selected.

The orthodontic bracket, as described, includes a first form of a bracket base 20, and which is operable to individually, matingly and sequentially cooperate with a multiplicity of bracket bodies 40 so as to facilitate the multiple step orthodontic treatment regimen selected by the clinician. In the preceding paragraphs, one possible bracket body 40 has been described in significant detail. One of the features of the present invention relates to an orthodontic bracket or appliance which encourages clinicians to utilize orthodontic appliances and methods of orthodontic treatment which are familiar to them so as to expedite the treatment of a patient, and to avoid patient discomfort during the orthodontic treatment regimen which is selected. As noted earlier in this Application, due to a number of pressing issues which confront practicing clinicians, often the adoption and mastering of new orthodontic techniques, practices and appliances is delayed because of the time necessary to master any new techniques, and then "juggle" competing demands of patient loads, and existing treatment plans which have already been established for patients. The present invention provides a means by which clinicians may continue to use orthodontic appliances and techniques which are familiar to them, and may proceed with orthodontic treatment plans or regimens which have already been established, but which now will be expedited because the clinician will no longer need to remove entire orthodontic brackets 40 from a patient's tooth 11 in order to expedite a treatment plan. Rather, the clinician will merely need to remove, and then replace the required bracket body 40 which is releasably and adjustably mounted on the bracket base 20, and which remains permanently affixed to the patient's tooth 11 during the treatment plan or regimen.

In the arrangement as seen in the drawings, the several bracket bodies 40 as discussed, herein, matingly cooperate with a bracket base 20, such as previously described, and which are adjustably moveable relative to the bracket base 20 and during the implementation of multiple step orthodontic treatment plan. Still further, and as determined by the clinician, at least some of the bracket bodies 40, as disclosed herein, matingly cooperate with the bracket base 20, and are immoveable during the multiple step orthodontic treatment regimen. Still further, it should be understood from a study of the Figures that at least some of the bracket bodies 40 when matingly cooperating with the bracket base 20, as disclosed, are adjustably moveable and immoveable relative to the bracket base 20, and during the orthodontic treatment regimen. Such can be effected by the use of the bracket body insert 100 as earlier discussed. It should be noted the bracket body insert 100, when cooperating with the previously described bracket base 20 is effective in adjustably orienting or positioning the bracket body 40 in given orientations relative to the bracket base 20, so as to effect first, second and third order movements 13, 14 and 15 respectively while substantially maintaining the position of the center 67 of the arch wire slot 60.

OPERATION

The operation of the described embodiment of the present invention is believed to be readily apparent, and is briefly summarized at this point. In one of its broadest aspects, the present invention relates to an orthodontic bracket 10 which includes a platform base 20 and which further is releasably retained on an anterior surface 12 of a patient's tooth 11. Further, the invention 10 includes multiple bracket bodies 40 which can individually, matingly and sequentially cooperate with the platform base 20 so as to facilitate an orthodontic treatment method/regimen which is selected for a patient by a treating clinician, and without a removal of the platform base 20 from the anterior facing surface 12 of the patient's tooth 11 during the orthodontic treatment regimen.

A method for treating a malocclusion of a patient's teeth 11 with a passive ligation orthodontic apparatus system comprises the steps of: inspecting the patient's teeth 11 and identifying a present location and a present orientation of each individual tooth 11 requiring orthodontic treatment along a patient's dental arch (not shown); determining a desired location and a desired orientation of each individual tooth 11 along the patient's dental arch; determining first 13, second 14 and third 15 order forces necessary to move and re-orient each individual tooth 11 from the present identified location and present identified orientation to the determined desired location and the determined desired orientation along the patient's dental arch; selecting an appropriate bracket base 20, and an appropriate bracket body 40 and appropriate bracket body insert 100 for each individual tooth 11 to achieve the determined desired movement and re-orientation of each individual tooth 11 from the present location and present orientation to the determined desired location and the determined desired orientation along the patient's dental arch; attaching the selected appropriate bracket base 20 to an anterior facing surface 12 of the identified individual teeth 11 and aligning the selected appropriate bracket base 20 to achieve center level arch-wire slot 60 line-up with immediately adjacent bracket bodies on the immediately adjacent teeth; attaching the selected appropriate bracket body 40 to each attached bracket base 20 and orienting each selected bracket body 40 relative to the attached bracket base 20 so as to exert the pre-determined first 13, second 14 and third 15 order forces to achieve the desired movement of the respective teeth 11 while maintaining center level arch-wire slot 60 line-up; installing the selected bracket body insert 100 into each bracket body 40 that is attached to and oriented relative to the bracket base 20 and inserting a retention pin 120 in a through hole 73 defined in the bracket body insert 100 and the bracket body 40 to releasably positionally secure and positionally maintain the bracket body 40 relative to the bracket base 20 so as to establish the desired bracket body 40 orientation and center level arch wire slot 60 line-up; selecting a first appropriate arch wire 90 to be operably received within the aligned center level arch-wire slots 60 defined by the respective bracket bodies 40 which are attached to the individual bracket bases 20 and exerting the pre-determined first 13, second 14 and third 15 order forces to achieve the desired movement and the desired orientation of each of the patient's teeth 11 undergoing the dental treatment, and wherein the archwire 90 has an original configuration which is similar in shape to the patient's dental arch; placing the selected first appropriate arch wire 90 into the respective center level arch wire slot 60 defined by each bracket body 40 without materially deforming, bending or twisting the first arch wire 90 out of the first arch wire's original configuration which is substantially similar to the patient's dental arch; slidably attaching a movable gate 50 to each selected bracket body 40, and urging the moveable gate 50 into a position so that the center level arch-wire slot 60 is substantially closed by the movable gate 50 and the arch-wire 90 is operably oriented within the center level arch-wire slot 60 and is further only axially movable relative to the center level arch-wire slot 60 and wherein the arch-wire 90 exerts a first order of movement 13, a second order of movement 14 and a third order of movement 15 to each individual tooth 11 without simultaneously exerting the same first order of movement 13, the same second order of movement 14 or the same third order of movement 15 upon any adjacent teeth 11 receiving orthodontic treatment; monitoring the first order of movement 13, the second order of movement 14, and the third order of movement 15 of each of the patient's teeth 11 from the present location and the present orientation of each tooth 11 toward the desired location and the desired orientation of each tooth 11; determining when each of the patient's teeth 11 undergoing orthodontic treatment has moved in a desired first order 13, second order 14 and third order 15 of movement to an intermediate location, and an intermediate orientation and a neutral position relative to the arch-wire 90 which is operably received within the center level arch-wire slot 60 and wherein the first arch wire 90 is no longer exerting first 13, second 14 and third 15 order forces on the respective teeth 11; removing the selected first arch-wire 90 from the respective center level arch wire slots 60 defined by each of the bracket bodies 40; selecting a second appropriate arch wire 90 to be operably received within the center level arch-wire slots 60 which are individually defined by each of the bracket bodies 40 which are releasably attached to the respective bracket bases 20 so as to achieve the desired movement and desired orientation of each individual teeth 11; placing the selected second appropriate arch wire 90 into the center level arch wire slot 60 defined by each bracket body 40 and urging the moveable gate 50 into a position so that the center level arch-wire slot 60 is at least partially occluded by the movable gate 50 so that the selected second arch-wire 90 which is carried and enclosed within the center level arch-wire slot 60 is only axially movable within the center level arch-wire slot 60, and wherein the selected second arch-wire 90 exerts a clinician selected first order of movement 13, a second order of movement 14 and/or a third order of movement 15 upon each individual tooth 11 without exerting the same first order of movement 13, the same second order of movement 14 and the same third order of movement 15 upon any adjacent tooth 11 of the patient; monitoring the first order of movement 13, the second order of movement 14 and the third order of movement 15 of each of the patient's teeth 11 from the intermediate location and intermediate orientation toward the desired final location and the desired final orientation for each tooth; determining when each individual tooth 11 has moved in a desired first order 13, second order 14 and third order 15 of movement to a neutral position relative to the selected second arch-wire 90 within the arch-wire slot 60 and into the desired final location and the desired final orientation; and removing the selected second arch wire 90, the respective bracket body inserts 100, bracket bodies 40 and the bracket bases 20 from the patient's teeth 11.

The method may further comprise the steps of adjusting the orientation of the bracket body 40 relative to the respective bracket base 20 by at least partially removing the bracket body insert 100 from the arch wire slot 60; pivoting the respective bracket body 40 relative to the respective bracket base 20 into a new second desired orientation; reinstalling the bracket body insert 100 to positionally secure the bracket body 40 to the bracket base 20 in the new second desired orientation; and inserting the arch wire 90 into the arch wire slot 60.

The instant inventive method utilizes an orthodontic bracket apparatus for treating a malocclusion, that comprises a bracket base 20 which is configured for releasable attachment upon on an anterior facing surface 12 of a patient's tooth 11, which requires an orthodontic treatment regimen which is selected by a treating clinician; and multiple bracket bodies 40 which can individually, matingly and sequentially cooperate with the bracket base 20 so as to facilitate the orthodontic treatment regimen for a patient by the treating clinician, and without a removal of the bracket base 20 from the anterior facing surface 12 of the patient's tooth 11 during the orthodontic treatment regimen, and each of the multiple bracket bodies 40 defines a three sided arch wire slot 60 in an anterior surface portion 42, and the arch wire slot 60 has two spaced apart parallel side walls 63, 64, a slot opening and a base wall 65 opposite the slot opening; a bracket body insert 100 releasably carried within the arch wire slot 60 of each bracket body 40 adjacent the base wall 65, each bracket body insert 100 having an engaging portion 111, 112 that extends outwardly therefrom and frictionally communicates with the respective bracket base 20 to positionally secure the respective bracket body 40 in a desired angular orientation relative to the respective bracket base 20, and further having an anterior facing surface 106 that forms a posterior portion of the arch wire slot 60; and an arch wire 90 for releasable simultaneous engagement within the arch wire slot 60 defined by each of the multiple bracket bodies 40, the arch wire 90 having a first original configuration positioned in closely spaced relationship relative to, and along, a dental arch of a patient, and wherein the arch wire 90 has a substantially uniform, circular square or circular rectangular cross-sectional shape, and wherein the substantially uniform cross-sectional shape has only two diametrically opposed radially convexly curved surfaces 96, 97, and only two diametrically opposed planar surfaces 91, 92.

The orthodontic bracket apparatus for treating a malocclusion and wherein the bracket base 20 has an anterior facing surface 22 and a posterior facing surface 23 with a thickness 28, 29 dimension therebetween, and the thickness dimension 28 at a first edge portion 26 of the bracket base 20 is different from the thickness dimension 29 at a spaced apart second edge portion 27 of the bracket base 20 and the differing thickness dimensions 28, 29 of the bracket base 20 from the first edge portion 26 to the second edge portion 27 is linear, and is between approximately 6.5° and 8.5° of angulation.

The orthodontic bracket apparatus for treating a malocclusion further comprising a medial passageway 70 defined in the bracket body 40 communicating from the base wall 65 of the archwire slot 60 to an opposing posterior surface 63 of the bracket body 40, and a transversely extending through hole 73 defined in the bracket body 40 spacedly adjacent the posterior surface 63 and perpendicular to the archwire slot 60, the transverse through hole 73 intersecting the medial passageway 70 and configured to releasably carry a retention pin 120 therein; and wherein the bracket body insert 100 has an elongated main body 103 with the first end 101, a second end 102, a top 104, a bottom 105, an anterior facing surface 106, a posterior facing surface 107 and an engagement member 118 configured to be axially received within the medial passageway 70 defined by the bracket body 40, the engagement member 118 extending generally perpendicularly from the posterior facing surface 107 medially between the first end 101 and the second end 102, the engagement member 118 further has a distal end 121 spaced apart from the main body 103 and defines an elongated hole 119 communicating between the top 104 and the bottom 105, and between the distal end 121 and the main body 123, and when the engagement member 118 is engaged within the medial passageway 70 defined by the bracket body 40, the elongated hole 119 is aligned with the transverse through hole 73 defined in the bracket body 40, and the engagement member 118 carries friction ridges 110 thereon to frictionally communicate with peripheral surfaces of the medial passageway 70 to eliminate any "movement" therebetween; and the elongated hole 119 defined in the engagement member 118, in cooperation with the retention pin 120 extending therethrough allows limited axial movement of the bracket body insert 100 relative to the bracket body 40 so as to allow the bracket body 40 to be rotatably moved relative to the respective bracket base 20 permitting the treating clinician to adjust the relative position of the respective bracket bodies 40 relative to the respective bracket bases 20 so as to facilitate the orthodontic treatment regimen of the patient.

The orthodontic bracket apparatus for treating a malocclusion and wherein the bracket body insert 100 is configured and dimensioned to operably cooperate with the respective bracket bodies 40 so as to secure the respective bracket bodies 40 in a predetermined orientation relative to the bracket base 20 and the patient's tooth 11 during the orthodontic treatment regimen, and wherein the respective bracket bodies 40 each have an anterior facing surface 42 which defines an arch wire slot 60, and an opposite posterior facing surface 43 which moveably and engagingly cooperates with the bracket base 20, and wherein each bracket body 40 defines a first passage 71 in a first edge portion 44 adjacent the archwire slot 60, the first passage 71 communicating from the base wall 65 of the archwire slot 60 to the posterior facing surface 43 of the bracket body 40, and each bracket body 40 further defines a second passage 72 in a second edge portion 45 and adjacent the archwire slot 60, the second passage 72 communicating from the base wall 65 of the archwire slot 60 to the posterior facing surface 43 of the bracket body 40; and the bracket body insert 100 has an elongated main body 103 with a first end portion 101, a second end portion 102, a posterior facing surface 106, and an anterior facing surface 107 and further has first 111 and second 112 engagement portions that extend normally, downwardly, relative to the posterior facing surface 106 of the elongated main body 103 adjacent the first end portion 101 and the second end portion 102, each engagement portion 111, 112 configured and dimensioned so as to be slidably received within the first passage 71 and second passage 72 defined in the first 44 and second 45 edge portions of the bracket body 40, each engagement portion 111, 112 further having a distal end opposite the elongated main body 103 which is operable to be matingly received within one of a multiplicity of spacedly arrayed engagement regions 36 which are formed in an anterior surface 22 of the bracket base 20, and each bracket body insert 100 further has a flange portion 113 at each end portion 101, 102 of the elongated main body 103 that extends outwardly relative to the bracket body 40, and is dimensioned to be received within a side recess 37 defined in a side portion 26, 27 of the bracket base 20 adjacent the multiplicity of spacedly arrayed engagement regions 36 when the bracket body insert 100 is engaged with both of the bracket body 40 and the bracket base 20, and wherein the first and second engagement portions 111, 112 and the flange portions 113 are configured to allow only limited movement of the bracket body insert 100 relative to the respective bracket body 40 and arch wire slot 60, and wherein the limited movement of the bracket body insert 100 relative to the bracket body 40 permits a clinician to adjust the relative position of the respective bracket bodies 40 relative to the bracket base 20 so as to facilitate the orthodontic treatment regimen of the patient.

The orthodontic bracket apparatus for treating a malocclusion wherein at least some of the bracket bodies 40 when matingly cooperating with the bracket base 20 are adjustably movable, or immovable, relative to the bracket base 20, and during the orthodontic treatment regimen.

The orthodontic bracket apparatus for treating a malocclusion and wherein the bracket bodies 40 which matingly cooperate with the bracket base 20 are immovable or adjustably movable relative to the bracket base, and during the orthodontic treatment regimen, and wherein the respective bracket bodies 40 further include conventional bracket bodies; twin bracket bodies; passive ligating bracket bodies; active ligating bracket bodies; bracket bodies which are either immovable or adjustably moveable relative to the bracket base 20, and which generate neutral, high and/or low torques; and bracket bodies 40 having hooks and/or other orthodontic appliances, and which generate neutral, low and/or high torques on the patient's tooth 11 undergoing the orthodontic treatment regimen.

The orthodontic bracket apparatus for treating a malocclusion further comprising a bracket base 20 which is configured for releasable attachment to a tooth 11 of a patient undergoing a multiple step orthodontic treatment regimen prescribed by a clinician, and wherein the bracket base 20 remains affixed to the tooth 11 of the patient during the duration of the orthodontic treatment regimen, and wherein the orthodontic treatment regimen selected by the clinician may require that the clinician impart a first 13, second 14, and/or third 15 order of movement to the tooth 11 of the patient undergoing the orthodontic treatment regimen; and a multiplicity of bracket bodies 40 which are selected by the clinician, and which individually, and sequentially, releasably and matingly cooperate with the bracket base 20, during a predetermined, selected time period during the duration of the orthodontic treatment regimen, and which individually and/or collectively, facilitate the delivery of a clinician selected amount of force to each tooth 11 undergoing the orthodontic treatment regimen so as to impart the first 13, second 14 and/or third 15 orders of movement selected by the clinician to achieve a desired movement of the respective tooth 11.

The orthodontic bracket apparatus for treating a malocclusion and wherein the bracket bodies 40 which cooperate with the bracket base 20 are immovable or adjustably movable relative to the bracket base 20, and during the orthodontic treatment regimen, and wherein the respective bracket bodies 40 further include conventional bracket bodies; twin bracket bodies; passive ligating bracket bodies; active ligating bracket bodies; bracket bodies which are either immovable or adjustably moveable relative to the platform base 20, and which generate neutral, high and/or low torques; and bracket bodies 40 having hooks and/or other orthodontic appliances, and which generate neutral, low and/or high torques on the patient's tooth 11 undergoing the orthodontic treatment regimen.

An orthodontic bracket apparatus for treating a malocclusion, comprising a bracket base 20 which is configured to be matingly and releasably positioned adjacent to an anterior facing surface 12 of a patient's tooth 11, and wherein the patient's tooth 11 is subject to a multiple-step orthodontic treatment regimen, and wherein the bracket base 20 has an anterior 22 and a posterior 23 facing surface with a thickness dimension 28, 29 therebetween, and the thickness dimension 28 at a first edge portion 26 of the bracket base 20 is different from the thickness dimension 29 at a spaced apart second edge portion 27 of the bracket base 20; a multiplicity of bracket bodies 40 which are operable to individually, matingly, and sequentially cooperate with the anterior facing surface 22 of the bracket base 20, and which implement an individual step of the multiple-step orthodontic treatment regimen; and the posterior facing surface 23 of the bracket base 20 which is juxtaposed relative to the anterior facing surface 12 of the patient's tooth 11, and wherein the bracket base 12 has a predetermined, and variable thickness dimension 28, 29 and topography which locates the respective bracket bodies 40 which cooperate with the bracket base 20 in an orientation relative to the patient's tooth 11 which is undergoing an orthodontic treatment regimen so as to impart varying degrees of torque, and other forces, and which, in combination corrects an orthodontic anomaly which the patient's tooth 11 possesses.

The orthodontic bracket apparatus for treating a malocclusion and wherein the multiple-step orthodontic treatment regimen includes the treatment of a multiplicity of patient's teeth 11 which have individually unique orthodontic anomalies, and wherein the same bracket base 20 is employed on each of the patient's teeth 11, and remains affixed to the respective tooth 11 during the entire orthodontic treatment regimen.

An orthodontic bracket apparatus for treating a malocclusion, comprising a bracket base 20 which is configured to be releasably retained on an anterior facing surface 12 of one of a multiplicity of a patient's teeth 11 with an adhesive, and wherein at least some of the patient's teeth 11 require an orthodontic treatment regimen which is implemented substantially simultaneously by a clinician, and wherein the bracket base 20 remains affixed to the anterior facing surface 12 of the patient's tooth 11 during the orthodontic treatment regimen; multiple bracket bodies 40 which can individually, matingly, and sequentially cooperate with, and partially rotate relative to the bracket base 20 so as to facilitate the orthodontic treatment regimen, and wherein each bracket body 40 defines a three sided arch wire slot 60 in an anterior surface portion 42, and each arch wire slot 60 has two spaced apart parallel side walls 63, 64, a slot opening and a base wall 65 opposite the slot opening, and each three sided arch wire slot 60 further has a central region, and a center 67, and which further is oriented along a given line of reference, and which extends between the central region of the arch wire slot 60, and the central region of other arch wire slots of still other bracket bodies 40 which are located on the patient's other, and adjacent teeth 11 which are undergoing the orthodontic treatment regimen; and an arch wire 90 extending between, and received within, the arch wire slot 60 of each of the respective bracket bodies 40, and which are releasably positioned on the anterior facing surface 12 of the respective patient's teeth 11, and which further are undergoing the orthodontic treatment regimen, and wherein a partial rotation of a bracket body 40, relative to the respective bracket base 20, permits a clinician to impart a predetermined amount of torque on the patient's respective teeth 11 by forcibly engaging the arch wire 90 which is substantially enclosed within the arch wire slot 60, and wherein an adjustment of the predetermined amount of torque and/or a replacement of the bracket body 40 which releasably engages the bracket base 20 takes place while the central region of each bracket body arch wire slot 60 remains substantially oriented along the predetermined line of reference, and in substantially the same vertical position relative to the arch wire slot 60 of the bracket bodies 40 which are located on the adjacent teeth 11 of the patient.

An orthodontic bracket apparatus for treating a malocclusion comprising an arch wire 90 having a first original configuration positioned in closely spaced relationship relative to, and along, a dental arch of a patient, and wherein the arch wire 90 has a substantially uniform, circular-square or circular-rectangular cross-sectional shape, and wherein the substantially uniform cross-sectional shape has only two diametrically opposed radially curved surfaces 96, 97, and only two diametrically opposed planar surfaces 91, 92; a first orthodontic bracket 10, and a second orthodontic bracket 10, and wherein each of the first and second orthodontic brackets 10 have, a bracket body 40 and a bracket base 20, which is located on a posterior side 43 of the bracket body 40, and further having a posterior surface 23 adapted to be releasably affixed to an anterior facing surface 12 of a patient's tooth 11, and wherein the bracket body 40 further has an anterior 42, outwardly facing surface defining an opening to an arch wire slot 60 defined in the bracket body 40, and wherein the arch wire slot 60 is sized so as to receive the arch wire 90 therein, and the anterior outwardly facing portion 42 of the bracket body 40 is configured to slidably carry a movable gate 50, and wherein the movable gate 50 has an anterior facing surface 54 and an opposing posterior facing surface 55, and is further slidably movable between an open position 52 relative to the opening of the arch wire slot 60, and a closed position relative to the opening of the arch wire slot 60, and wherein, when the moveable gate 50 is located in the closed position relative to the opening of the arch wire slot 60, the posterior facing surface 55 of the moveable gate 50 and the arch wire slot 60 define a four sided arch wire channel 60 having a cross-sectional, quadrilateral shape that is defined by four angles which are not necessarily right angles, and wherein the quadrilateral arch wire channel 60 encloses and cooperates with the arch wire 90 to apply a predetermined force 13, 14, 15 to the bracket body 40 so as to effect first 13, second 14, and/or third 15 order movements to the patient's tooth 11, and wherein the arch wire 90 is movable axially within the quadrilateral arch wire channel 60 and relative to the bracket body 40 and bracket base 20, and wherein the anterior facing surface 55 of the moveable gate 50 lies substantially along a plane defined by the anterior, outwardly facing surface 42 of the bracket body 40, a rib 56 on the anterior facing surface 54 of the moveable gate 50 maintains a precise angular orientation of the moveable gate 50 relative to the respective bracket body 40; and wherein the first bracket base 20 is releasably affixed to an anterior surface 12 of a first tooth 11 of the patient, and the first bracket body 40 has a first angular orientation of its respective quadrilateral arch wire channel 60 relative to its respective bracket base 20 so as to direct a first predetermined force to the first tooth 11 and effect a resulting movement of the first tooth 11; and wherein the second bracket base 20 is releasably affixed to an anterior surface 12 of a second tooth 11 of the patient, and wherein the second bracket body 40 has a second angular orientation for its respective quadrilateral arch wire channel 60 relative to its respective bracket base 20 so as to direct a second predetermined force to the second tooth 11, and effect a resulting movement of the second tooth 11, and wherein the first angular orientation is different than the second angular orientation; and wherein the first bracket body 40 and the second bracket body 40 align to a center level arch wire slot 60 line-up, and the arch wire 90 is not intentionally distorted prior to placement within the respective arch wire slots 60 defined in the respective bracket bodies 40 to assume a shape different from the original first configuration so as to impart a force to the first tooth 11 or the second tooth 11.

The orthodontic bracket apparatus for treating a malocclusion and wherein the cross-sectional quadrilateral shape of the four sided arch wire channel 60 is a parallelogram.

The orthodontic bracket apparatus for treating a malocclusion and wherein the cross-sectional quadrilateral shape of the four sided arch wire channel 60 is a rhomboid.

The orthodontic bracket apparatus for treating a malocclusion and wherein the first bracket base 20 and the second bracket base 20 are substantially horizontally aligned from tooth 11 to adjacent tooth 11.

The orthodontic bracket apparatus for treating a malocclusion and wherein the bracket base 20 of the first orthodontic bracket 10 is aligned on the first tooth 11 based at least in part on a longitudinal axis 11C of the first tooth 11, and the bracket base 20 of the second orthodontic bracket 10 is aligned on the second tooth 11 based at least in part on a longitudinal axis 11C of the second tooth 11.

The orthodontic bracket apparatus for treating a malocclusion and wherein the rib 56 that is formed on the anterior facing surface 54 of the movable gate 50 is positioned spacedly adjacent the peripheral edge thereof, and the rib 56 slidably engages the respective bracket body 40 to maintain the moveable gate 50 in a precise given orientation relative to the bracket body 40 so as to maintain the precise cross-sectional quadrilateral shape of the arch wire channel 60, when the movable gate 50 is in the closed position.

The orthodontic bracket apparatus for treating a malocclusion and wherein the cross-sectional quadrilateral shape of the arch wire channel 60 is defined by parallel, inwardly facing, spaced apart, superior 61 and inferior 62 surfaces of the arch wire slot 60, an anterior facing surface 106 of the bracket body insert 100 which extends between the superior 61 and inferior 62 facing surfaces of the arch wire slot 60, and the posterior facing surface 55 of the moveable gate 50, and wherein the superior inwardly facing surface 61 of the arch wire slot 60, the inferior inwardly facing surface 62 of the arch wire slot 60, the anterior facing surface 106 of the bracket body insert 100, and the posterior inwardly facing surface 55 of the moveable gate 50 are oriented in a same spatial relationship in the first orthodontic bracket 10 and the second orthodontic bracket 10.

The orthodontic bracket apparatus for treating a malocclusion and wherein the anterior facing surface 106 of the bracket body insert 100 is parallel to the posterior inwardly facing surface 55 of the movable gate 50 when the respective movable gate 50 is in a closed position relative to the arch wire slot 60 opening.

The orthodontic bracket apparatus for treating a malocclusion and wherein the anterior facing surface 106 of the bracket body insert 100 is not parallel to the posterior inwardly facing surface 55 of the movable gate 50 when the respective movable gate 50 is in a closed position relative to the arch wire slot 60 opening.

The orthodontic bracket apparatus for treating a malocclusion and wherein at least one of the four corner angles which define a portion of the quadrilateral cross-sectional shape of the arch wire channel 60 has a rounded corner having a given radius.

The orthodontic bracket apparatus for treating a malocclusion and wherein the substantially uniform cross-sectional shape of the arch wire 90 has a superior facing surface 91 and an inferior facing surface 92, and the superior facing surface 91 and the inferior facing surface 92 are spaced apart, parallel, and extend between and connect the two diametrically opposed radially convexly curved surfaces 96, 97.

The orthodontic bracket apparatus for treating a malocclusion and wherein the arch wire 90 has a predetermined diameter 99 between the only two diametrically opposed radially convexly curved surfaces 96, 97, and wherein the predetermined diameter 99 is selected to maintain a consistent first order movement control of the first tooth 11 and the second tooth 11 when the arch wire 90 is within the quadrilateral arch wire channel 60 and cooperating with the respective bracket bodies 40, and wherein a thickness dimension 93 of the arch wire 90 between the only two opposing, parallel, planar non-curved surfaces 91, 92 controls an application of force to the respective bracket bodies 40 to direct second 14 or third 15 order movements to the first and second teeth 11 of the patient.

The orthodontic bracket apparatus for treating a malocclusion and wherein the arch wire channel 60 has a height dimension 18 between a superior inwardly facing surface 63 and an inferior inwardly facing surface 64, and wherein the arch wire 90 has a thickness dimension 93 between the only two opposing, parallel, planar non-curved surfaces 91, 92, and wherein the thickness dimension 93 is greater than about 50% of the height dimension 18 of the arch wire channel 60, and wherein the thickness dimension 93 imparts an amount of torqueing force to the respective bracket bodies 40 so as to direct the second 14 or third 15 order movements to the respective tooth 11, while the only two diametrically opposed radially convexly curved surfaces 96, 97 of the arch wire 90 maintain first order 13 control of the respective tooth 11.

The orthodontic bracket apparatus for treating a malocclusion and wherein each of the only two diametrically opposed radially convexly curved surfaces 96, 97 of the arch wire 90 each contact an interior surface 106, 55 of the arch wire channel 60 at only a single point of contact.

The orthodontic bracket apparatus for treating a malocclusion and wherein the only two diametrically opposed radially convexly curved surfaces 96, 97 of the arch wire 90 are arcs having a single shared center 95.

An orthodontic bracket apparatus for treating a malocclusion comprising an arch wire 90 having a first original configuration positioned in closely spaced relationship relative to, and along, a dental arch of a patient, and wherein the arch wire 90 has a substantially uniform, circular-square or circular-rectangular cross-sectional shape along its entire length, and wherein the substantially uniform cross-sectional shape has only two diametrically opposed radially convexly curved surfaces 96, 97, and only two opposed and parallel generally planar surfaces 91, 92, and the only two opposed and parallel generally planar surfaces 91, 92 extend between and communicate with the only two diametrically opposed radially convexly curved surfaces 96, 97; a first orthodontic bracket 10, and a second orthodontic bracket 10, and wherein each of the first and second orthodontic brackets 10 have a bracket body 40 and a bracket base 20, which is located on a posterior side 43 of the bracket body 40, and further having a posterior surface 23 adapted to be releasably affixed to an anterior facing surface 12 of a patient's tooth 11, and wherein each bracket body 40 further has an anterior, outwardly facing surface 42 defining an opening to an arch wire slot 60 defined in the bracket body 40, and wherein the arch wire slot 60 is sized so as to receive a bracket body insert 100 and the arch wire 90 therein, and the anterior outwardly facing portion 42 of the bracket body 40 is configured to slidably carry a movable gate 50, and wherein the movable gate 50 has an anterior facing surface 54 and an opposing posterior facing surface 55, and is further slidably movable between an open position 52 relative to the opening of the arch wire slot 60, and a closed position relative to the opening of the arch wire slot 60, and wherein, when the moveable gate 50 is located in the closed position relative to the opening of the arch wire slot 60, the posterior facing surface 55 of the moveable gate 50, an anterior surface 106 of the bracket body insert 100, and superior 63 and inferior 64 surfaces of the arch wire slot 60 define the arch wire channel 60 having a cross-sectional, quadrilateral shape that is defined by four angles which are not necessarily right angles, and wherein the quadrilateral arch wire channel 60 encloses and cooperates with the arch wire 90 to apply a predetermined force to the bracket body 40 so as to effect first 13, second 14, and/or third 15 order movements to the patient's tooth 11, and wherein the arch wire 90 is movable axially within the quadrilateral arch wire channel 60 and relative to the bracket body 40, and wherein the anterior facing surface 55 of the moveable gate 50 lies substantially along a plane defined by the anterior, outwardly facing surface 42 of the bracket body 40, and a rib 56 on the anterior facing surface 54 of the moveable gate 50 maintains a precise angular orientation of the moveable gate 50 relative to the bracket body 40, and wherein the first orthodontic bracket 10 is releasably affixed to an anterior facing surface 12 of a first tooth 11 of the patient, and the first orthodontic bracket 10 has a first angular orientation of its respective quadrilateral arch wire channel 60 relative to its respective bracket base 20 so as to direct a first predetermined force to the first tooth 11 and effect a resulting movement of the first tooth 11, and wherein the second orthodontic bracket 10 is releasably affixed to an anterior facing surface 12 of a second tooth 11 of the patient, and wherein the second orthodontic bracket 10 has a second angular orientation of its respective quadrilateral arch wire channel 60 relative to its respective bracket base 20 so as to direct a second predetermined force to the second tooth 11, and effect a resulting movement of the second tooth 11, and wherein the first angular orientation is different than the second angular orientation, and wherein the first orthodontic bracket 10 and the second orthodontic bracket 10 align to a center level arch wire slot 60 line-up; and the arch wire 90 is not intentionally distorted to assume a shape different from the original first configuration so as to impart the predetermined force to the first tooth 11 and to the second tooth 12.

The orthodontic bracket apparatus for treating a malocclusion and wherein the two diametrically opposed radially curved convex surfaces 96, 97 of the arch wire 90 are arcs having a single shared center 95.

The orthodontic bracket apparatus for treating a malocclusion and wherein arch wire 90 has an elongated and resilient main body 94 which has a single, predetermined diameter dimension 99, and a single predetermined thickness dimension 93 and wherein the single predetermined diameter dimension 99 of the resilient main body 94 maintains a consistent first order movement 15 control of the patient's tooth 11 when the resilient main body 94 of the arch wire 90 is received, and enclosed within the quadrilateral arch wire channel 60 throughout the entire orthodontic treatment regimen, and wherein the single predetermined, and uniform thickness dimension 93 of the arch wire 90 facilitates an application of the given torqueing couple to the passive ligation orthodontic bracket body 40 so as to achieve a clinician selectable, and controllable, second 14 and third 15 order movement of the patient's tooth 11 without any intentional distortion, bending, twisting or deformation of the arch wire 90 by the clinician during the selected orthodontic treatment regimen, and wherein the quadrilateral arch wire channel 60, which encloses the arch wire 90, maintains the orientation of the enclosed arch wire 90 in the central region of the quadrilateral arch wire channel 60, so as to achieve the clinician selected first 13, second 14 and third 15 order movement of the patient's tooth 11, and wherein the arch wire 90 has a predetermined and constant diameter dimension 99 which is less than a depth dimension 17 of the quadrilateral arch wire channel 60, and a predetermined and constant thickness dimension 93 which is at least 55 percent of the height dimension 18 of the quadrilateral arch wire channel 60.

A orthodontic bracket apparatus for treating a malocclusion and further comprising: a second arch wire 90 having a second configuration positioned in closely spaced relationship to, and along the dental arch of a patient, and wherein the second arch wire 90 has a substantially uniform, circular square or circular rectangular cross-sectional shape along its entire length, and wherein the substantially uniform cross-sectional shape has only two diametrically opposed radially curved convex surfaces 96, 97, and further has a superior facing surface 91 and an opposing inferior facing surface 92, and the superior facing surface 91 and the opposing inferior facing surface 92 are spaced apart and parallel, and extend between and connecting the two diametrically opposed and radially convexly curved surfaces 96, 97, and wherein a thickness dimension 93 between the superior facing surface 91 and the opposing inferior facing surface 92 of the second arch wire 90 is different from that of the first arch wire 90.

An orthodontic bracket apparatus for treating a malocclusion, comprising: an arch wire 90 having an elongated body 94 configured to be placed in close adjacent proximity to a patient's dental arch, the elongated body 94 having a center 95 at a longitudinal axis 95 and a cross-sectional configuration having only two opposing and diametrically spaced apart radially convexly curved surfaces 96, 97 and only two opposing and diametrically spaced apart planar surfaces 91, 92; and a single consistent diameter dimension 99 of the elongated body 94 measured along any line extending from one radially convexly curved surface 96 to the diametrically opposed radially convexly curved surface 97 and passing through the center 95; and a single consistent thickness dimension 93 of the elongated body 94 measured along any line extending from one planar surface 91 to the diametrically opposed planar surface 92 and perpendicular to the two diametrically opposed apart planar surfaces 91, 92.

The orthodontic bracket apparatus for treating a malocclusion and wherein the arch wire 90 has a diametral dimension 99 which lies in a range of about 0.0225 mm to about 0.0300 mm.

The orthodontic bracket apparatus for treating a malocclusion and wherein the arch wire 90 has a thickness dimension which lies in a range of about 0.010 mm to about 0.020 mm.

The method for treating a malocclusion of a patient's teeth with a passive ligation orthodontic apparatus system and wherein the arch wire 90 has a diametral dimension 99 measured along a line passing through a center 95 and extending between the two diametrically opposed radially convexly curved surfaces 96, 97 that lies in a range of about 0.0225 mm to about 0.0300 mm; and a thickness dimension 93 measured along a line extending perpendicularly between the two diametrically opposed generally planar superior 91 and inferior surfaces 92 that lies in a range of about 0.010 mm to about 0.020 mm.

The method for treating a malocclusion of a patient's teeth 11 with a passive ligation orthodontic apparatus system and wherein the arch wire 90 has a diametral dimension 99 measured along a line passing through a center 95 and extending between the two diametrically opposed radially convexly curved surfaces 96, 97 of about 0.0275 mm.

The method for treating a malocclusion of a patient's teeth with a passive ligation orthodontic apparatus system and wherein the arch wire 90 has a thickness dimension 93 measured along a line extending perpendicularly between the two diametrically opposed generally planar superior 91 and inferior surfaces 92 that lies in a range of about 0.014 mm to about 0.018 mm.

Thee method for treating a malocclusion of a patient's teeth 11 with a passive ligation orthodontic apparatus system and wherein the bracket body insert 100 is adjustably secured relative to the bracket body 40 and the bracket base 20 by a retention pin 120 that extends through a transverse hole 73 defined in, and aligned in, the bracket body insert 100 and in the bracket body 40.

Therefore, it will be seen that the present invention provides treatment options for a clinician not possible heretofore. The present orthodontic bracket allows a clinician to proceed with a given treatment plan for a patient by employing multiple bracket bodies which can be releasably and matingly affixed to a bracket base 20 and which remains affixed to a patient's tooth 11 throughout the treatment regimen. This new orthodontic bracket 10 greatly enhances the treatment options available to a clinician, advances the speed of treatment of a patient beyond what has been available heretofore, and further increases the comfort of the patient during an orthodontic treatment regimen which may include multiple treatment steps. In addition to the foregoing advantages, manufacturers will experience increased cost savings because these same manufacturers can now fabricate multiple bracket body types which utilize the same bracket base, which can potentially, post-fabrication, be modified so as to be useful on patient's having tooth anomalies which could not be addressed heretofore.

In compliance with the Patent Statutes, the invention has been described in language more or less specific as to structural and methodical features. It should be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalence.

We claim:

1. An orthodontic bracket apparatus for treating a dental malocclusion, comprising: a bracket base which is configured for releasable attachment to an anterior facing surface of a tooth; at least one bracket body cooperates with the bracket base without removal of the bracket base from the anterior facing surface of the tooth and defines a three-sided arch wire slot in an anterior surface portion having two spaced-apart, parallel side walls, a slot opening, and a base wall opposite the slot opening; a bracket body insert releasably carried within the arch wire slot of the at least one bracket body adjacent the base wall, and wherein the bracket body insert has an elongated main body and an engaging portion that extends outwardly from the elongated main body so as to frictionally communicate with the bracket base to positionally secure the at least one bracket body in one of a plurality of predetermined angular orientations relative to the bracket base, and further having an anterior facing surface that forms a posterior portion of the arch wire slot; and a retention pin, wherein the at least one bracket body defines a medial passageway communicating from the base wall to an opposing posterior surface of the at least one bracket body, wherein a transversely extending through-hole is defined in the at least one bracket body, is located spacedly adjacent to the opposing posterior surface and is perpendicular to the arch wire slot, and wherein the transversely extending through-hole intersects the medial passageway and is further configured to releasably carry the retention pin therein, wherein the elongated main body has a first end, a second end, a top, a bottom, and a posterior facing surface, and an engagement member is-configured to be axially received within the medial passageway, wherein the engagement member extends generally perpendicularly from the posterior facing surface medially between the first end and the second end, and wherein the engagement member further has a distal end which is spaced apart from the elongated main body and further defines an elongated hole communicating between the top and the bottom and between the distal end and the elongated main body, wherein when the engagement member is received within the medial passageway, the elongated hole is aligned with the transversely extending through-hole, and the engagement member further defines friction ridges thereon which frictionally communicate with peripheral surfaces of the medial passageway so as to substantially eliminate any relative movement between the engagement member and the at least one bracket body, and wherein the elongated hole in cooperation with the retention pin extending therethrough allows limited axial movement of the bracket body insert relative to the at least one bracket body so as to allow the at least one bracket body to be rotatably moved relative to the bracket base to any one of the predetermined angular orientations when the bracket body insert is moved axially relative to the at least one bracket body.

2. An orthodontic bracket apparatus as claimed in claim 1, and wherein the bracket base has an anterior facing surface and a posterior facing surface with a thickness dimension defined therebetween, and wherein the thickness dimension at a first edge portion of the bracket base is different from the thickness dimension at a spaced apart second edge portion of the bracket base.

3. An orthodontic bracket apparatus as claimed in claim 2 and wherein the differing thickness dimensions of the bracket base as measured between the first edge portion and the second edge portion is linear, and is between approximately 6.5° and 8.5° of angulation.

4. An orthodontic bracket apparatus as claimed in claim 1, and wherein the bracket base includes a multiplicity of spacedly arrayed engagement regions which are formed in an anterior surface of the bracket base, and wherein the bracket body insert further has a flange portion located at each end portion of the elongated main body, and that extends outwardly relative to the bracket body, and is further dimensioned to be received within a side recess defined in a side portion of the bracket base, and which is adjacent to the multiplicity of spacedly arrayed engagement regions when the bracket body insert is engaged with both of the at least one bracket body and the bracket base, wherein the engaging portion, having first and second engagement portions, and the flange portions are configured to limit movement of the bracket body insert relative to the at least one bracket body and arch wire slot, and wherein the limited movement of the bracket body insert relative to the at least one bracket body permits a clinician to adjust the relative position of the at least one bracket body relative to the bracket base.

5. The orthodontic bracket apparatus as claimed in claim 1, further comprising:
an arch wire that has an elongated body, and wherein the elongated body has a center which is positioned along a longitudinal axis thereof, and a cross-sectional configuration having only two opposing, and diametrically spaced apart, radially convexly curved surfaces, and only two opposing and diametrically spaced apart planar surfaces; and wherein the arch wire further has a single consistent diametral dimension of the elongated body as measured along any line extending from one radially convexly curved surface to the diametrically opposed radially convexly curved surface and passing through the center; and wherein the arch wire further has a single consistent thickness dimension of the elongated body as measured along any line extending from one planar surface to the diametrically opposed planar surface and which is further perpendicular to the two diametrically opposed apart planar surfaces.

6. The orthodontic bracket apparatus of claim 5, and wherein the arch wire has a diametral dimension which lies in a range of approximately 0.0225 mm to about 0.0300 mm.

7. The orthodontic bracket apparatus of claim 5, wherein the arch wire has a thickness dimension which lies in a range of approximately 0.010 mm to about 0.020 mm.

8. An orthodontic bracket apparatus as claimed in claim 5, and wherein the only two opposing, and diametrically spaced apart, radially convexly curved surfaces of the arch wire are arcs having a single shared center.

9. An orthodontic bracket apparatus as claimed in claim 5, and wherein the anterior surface portion of the at least one bracket body is configured to slidably carry a movable gate,
wherein the movable gate has an anterior facing surface, and an opposing posterior facing surface, and is further slidably movable between an open position relative to the slot opening, and a closed position relative to the slot opening, and
wherein, when the movable gate is located in the closed position, the posterior facing surface of the movable gate and the arch wire slot define a four-sided arch wire channel and the anterior facing surface of the bracket body insert is parallel to the posterior, facing surface of the movable gate.

10. An orthodontic bracket apparatus as claimed in claim 9, and wherein the four-sided arch wire channel has a height dimension as measured between a superior inwardly facing surface and an inferior inwardly facing surface of the arch wire channel, and wherein the single consistent thickness dimension is greater than about 50% of the height dimension of the arch wire channel.

11. An orthodontic bracket apparatus as claimed in claim 9, and wherein each of the only two opposing, and diametrically spaced apart, radially convexly curved surfaces of the arch wire each contact an interior surface of the arch wire channel at only a single point of contact.

12. An orthodontic bracket apparatus as claimed in claim 1, wherein the anterior surface portion of the at least one bracket body is configured to slidably carry a movable gate,
wherein the movable gate has an anterior facing surface, and an opposing posterior facing surface, and is further slidably movable between an open position relative to the slot opening, and a closed position relative to the slot opening, and
wherein, when the movable gate is located in the closed position, the posterior facing surface of the movable gate and the arch wire slot define a four-sided arch wire channel having a cross-sectional, quadrilateral shape that is defined by four angles and the cross-sectional quadrilateral shape of the four-sided arch wire channel is a parallelogram.

13. An orthodontic bracket apparatus as claimed in claim 1, and wherein the anterior surface portion of the at least one bracket body is configured to slidably carry a movable gate,
wherein the movable gate has an anterior facing surface, and an opposing posterior facing surface, and is further slidably movable between an open position relative to the slot opening, and a closed position relative to the slot opening, and
wherein, when the movable gate is located in the closed position, the posterior facing surface of the movable gate and the arch wire slot define a four-sided arch wire channel having a cross-sectional, quadrilateral shape that is defined by four angles and the cross-sectional quadrilateral shape of the four-sided arch wire channel is a rhomboid.

14. An orthodontic bracket apparatus as claimed in claim 1, and wherein the anterior surface portion of the at least one bracket body is configured to slidably carry a movable gate,
wherein the movable gate has an anterior facing surface, and an opposing posterior facing surface, and is further slidably movable between an open position relative to the slot opening, and a closed position relative to the slot opening, and
wherein a rib is formed on the anterior facing surface of the movable gate, and the rib facilitates a precise angular orientation of the movable gate relative to the respective bracket body; wherein the rib slidably and frictionally engages the at least one bracket body to maintain the movable gate in a precise given orientation relative to the at least one bracket body when the movable gate is in the closed position.

* * * * *